United States Patent [19]

Malec et al.

[11] Patent Number: 4,973,952
[45] Date of Patent: Nov. 27, 1990

[54] SHOPPING CART DISPLAY SYSTEM

[75] Inventors: John Malec, Chicago; Joseph P. Moser, Glendale Heights, both of Ill.

[73] Assignee: Information Resources, Inc., Chicago, Ill.

[21] Appl. No.: 99,288

[22] Filed: Sep. 21, 1987

[51] Int. Cl.⁵ .............................. G06F 7/04; A63F 9/02
[52] U.S. Cl. ................................ 340/825.350; 186/62; 340/825.49; 364/400
[58] Field of Search .................... 186/61, 62; 364/464, 364/478, 479, 424, 400, 518, 900, 709.02; 455/56, 40, 18, 41; 40/308, 447, 446, 448; 340/825.35, 825.54, 825.55, 572, 755, 756, 765, 825.49; 369/198

[56] References Cited

U.S. PATENT DOCUMENTS

| | | | |
|---|---|---|---|
| 2,626,995 | 1/1953 | Hodson et al. | 369/198 X |
| 3,251,543 | 5/1966 | Bush et al. | |
| 3,281,978 | 11/1966 | Drugan et al. | |
| 3,641,432 | 2/1972 | Bond | |
| 4,002,886 | 1/1977 | Sundelin | 340/825.35 X |
| 4,021,953 | 5/1977 | Couch | |
| 4,071,740 | 1/1978 | Gogulski | 186/61 X |
| 4,130,801 | 12/1978 | Prygoff | |
| 4,139,149 | 2/1979 | Crepeau et al. | |
| 4,165,487 | 8/1979 | Corderman | 455/40 X |
| 4,242,668 | 12/1980 | Herzog | |
| 4,369,443 | 1/1983 | Giallanza et al. | 340/825.47 |
| 4,457,019 | 6/1984 | Szabo, Jr. et al. | 455/41 |
| 4,500,880 | 2/1985 | Gomersall et al. | 340/825.35 |
| 4,513,983 | 4/1985 | Calder | |
| 4,521,677 | 6/1985 | Sarwin | |
| 4,541,119 | 9/1985 | Cooper et al. | 455/18 X |
| 4,603,495 | 8/1986 | Stevens | |
| 4,645,705 | 2/1987 | Abbott, Jr. | |
| 4,673,932 | 6/1987 | Ekchian et al. | 340/825.35 X |
| 4,674,041 | 6/1987 | Lemon et al. | |
| 4,750,151 | 6/1988 | Baus | 365/400 |
| 4,882,724 | 11/1989 | Vela et al. | 364/400 X |
| 4,888,709 | 12/1989 | Revesz et al. | 364/518 |

OTHER PUBLICATIONS

"New Radio Steals its Power from the Air", Popular Science, Apr. 1958, pp. 108–109.
Terry L. Lyon, "How to Build Free-Power Radios", Popular Electronics, Oct. 1973, pp. 62–64.

*Primary Examiner*—Ulysses Weldon
*Attorney, Agent, or Firm*—Willian Brinks Olds Hofer Gilson & Lione

[57] ABSTRACT

A shopping cart display system includes a cart mounted display that is responsive to trigger signals provided by transmitters associated with a particular location. When the display receives a unique trigger signal, it displays advertising media associated with that location. In one embodiment, the display includes a sensor for determining whether the information is displayed in the presence of a consumer, and a memory for storing all trigger signals received during a given shopping trip. The stored data is transmitted to a polling transceiver located at a point of sale register for later analysis.

30 Claims, 26 Drawing Sheets

IDEAL TT ZONE COVERAGE

PRACTICAL TT ZONE COVERAGE

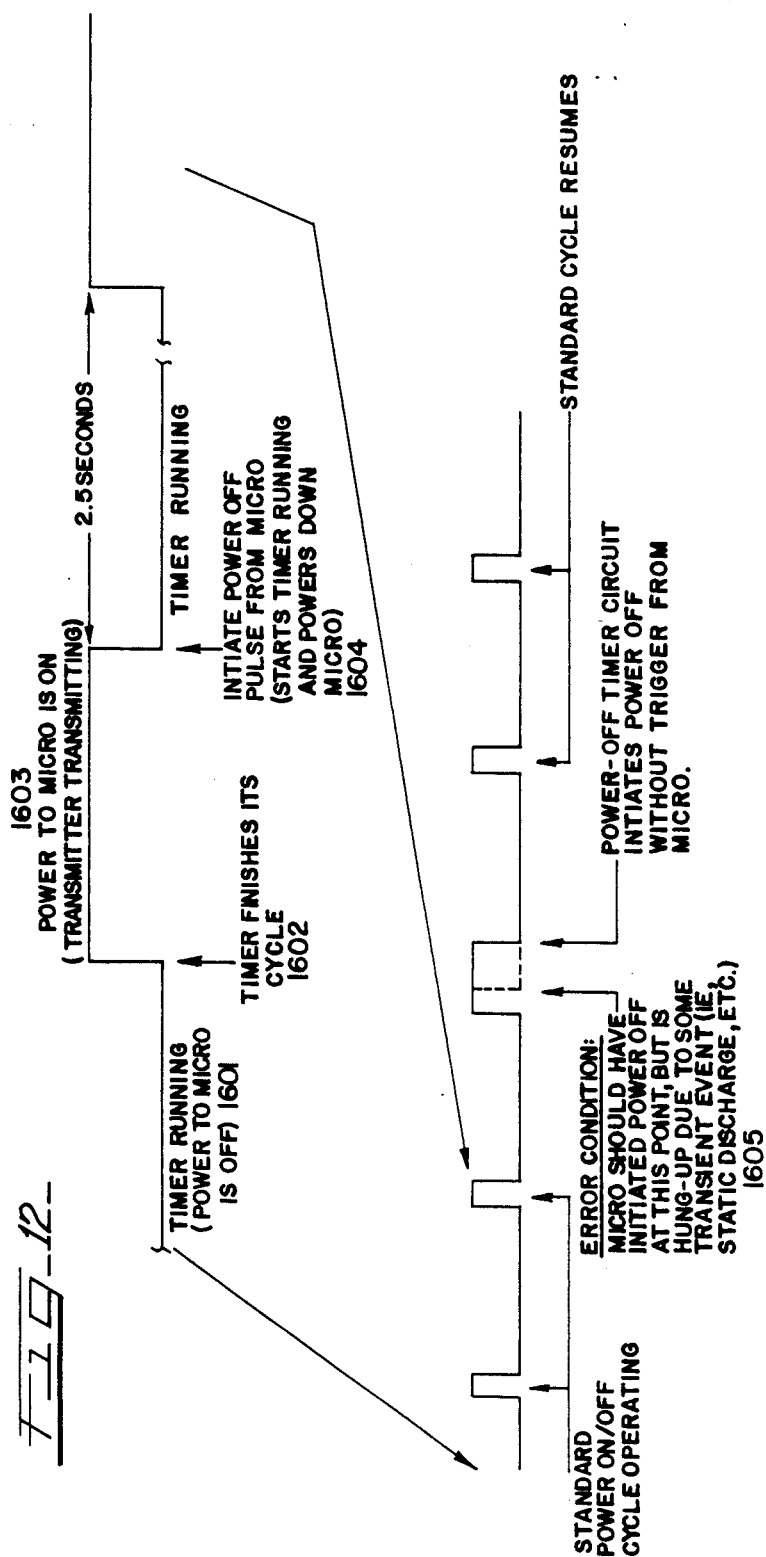

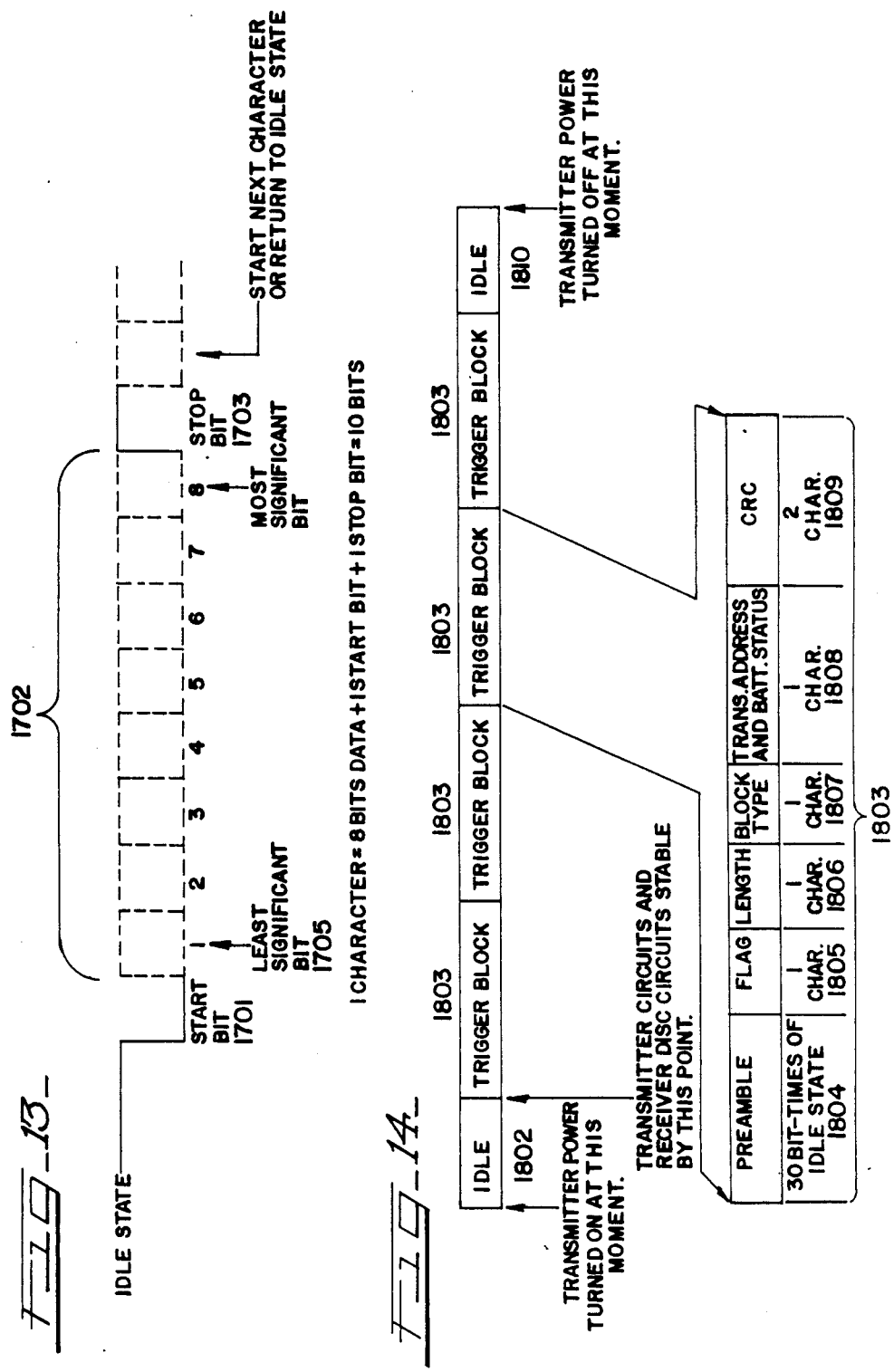

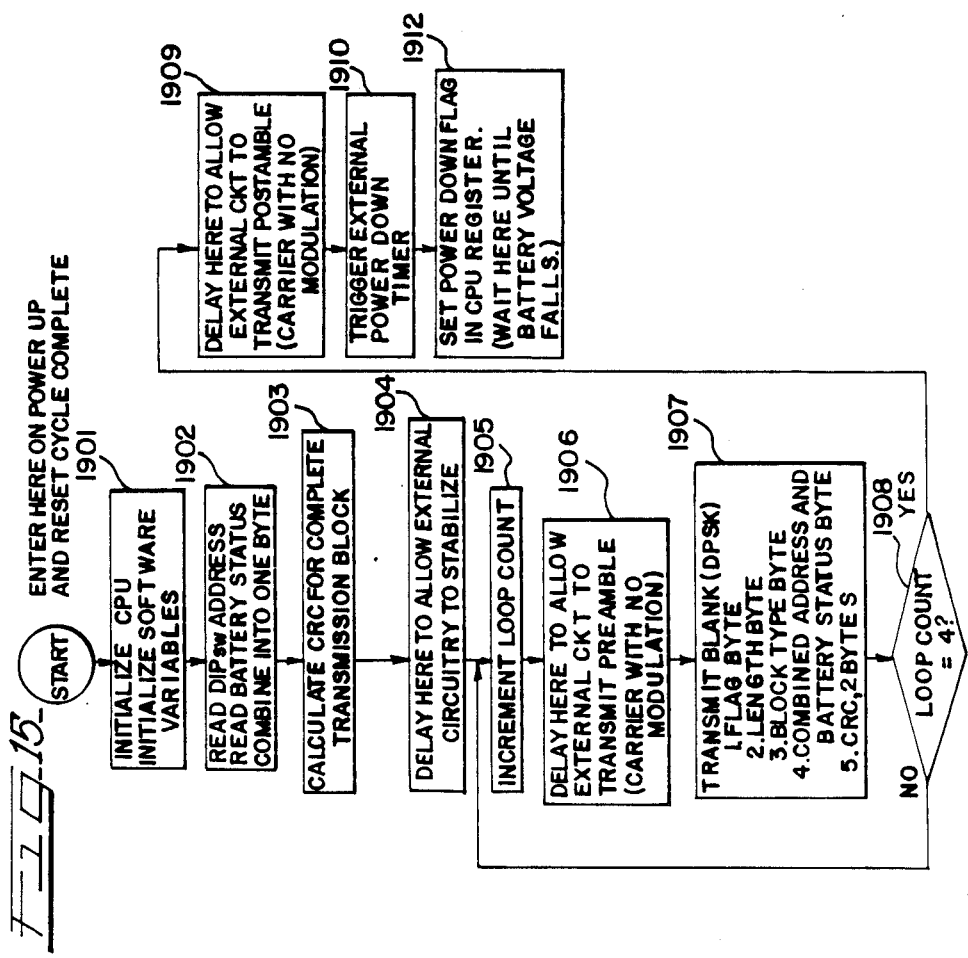

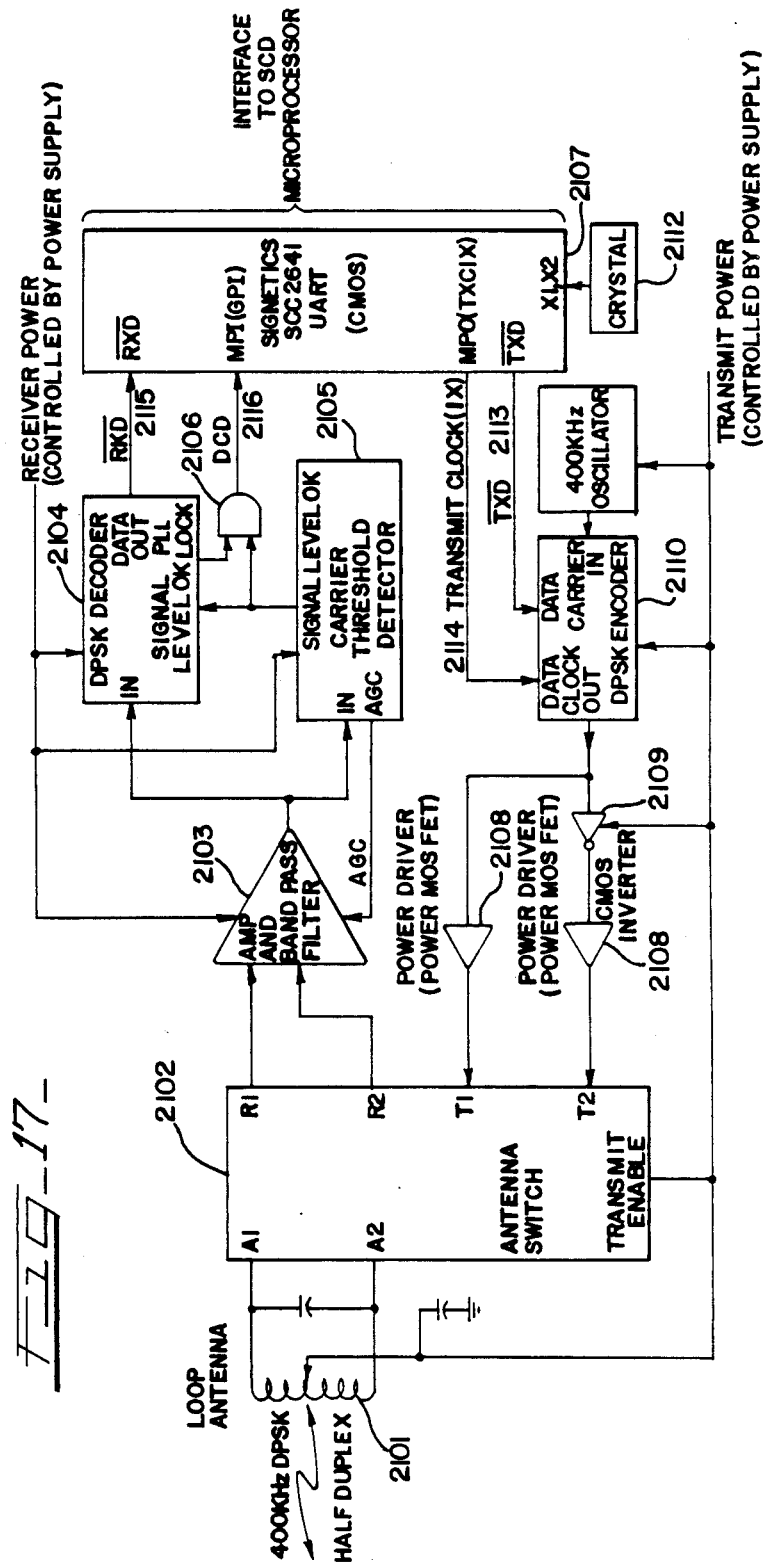

Fig. 19

| PREAMBLE | FLAG | LENGTH | BLOCK TYPE | TRANSCEIVER ADDRESS | CRC | POSTAMBLE |
|---|---|---|---|---|---|---|
| 30 BIT-TIMES OF IDLE STATE 2301 | 1 CHAR. 2302 | 1 CHAR. 2303 | 1 CHAR. 2304 | 1 CHAR. 2305 | 2 CHAR. 2306 | 30 BIT-TIMES OF IDLE STATE 2307 |

FORMAT OF TRANSMISSION BLOCK SEAT BY CHECK-OUT POLLING TRANSCEIVER TO TRIGGER RECEIVER ON SHOPPING CART

→ VALUE=HEXADECIMAL 01 INDICATES THIS IS A POLL REQUEST FROM THE CHECK-OUT POLLING TRANSCEIVER.
→ VALUE=HEXADECIMAL 02 INDICATES THIS IS A LOG DUMP REQUEST FROM THE CHECK-OUT POLLING TRANSCEIVER.
→ VALUE=HEXADECIMAL 03 INDICATES THIS IS A LOG CLEAR REQUEST FROM THE CHECK-OUT POLLING TRANSCEIVER.
→ VALUE=HEXADECIMAL 04 INDICATES THIS IS A POWER DOWN REQUEST.

Fig. 20

| PREAMBLE | FLAG | LENGTH | BLOCK TYPE | REQUESTING TRANSCEIVER ADDRESS | SHOPPING CART ADDRESS & BATT. STATUS | CRC | POSTAMBLE |
|---|---|---|---|---|---|---|---|
| 30 BIT-TIMES OF IDLE STATE | 1 CHAR. | 2 CHAR. | 1 CHAR. | 1 CHAR. | 2 CHAR. | 2 CHAR. | 30 BIT-TIMES OF IDLE STATE |

2403

→ TOP BIT INDICATES SHOPPING CART BATTERY STATUS, LOW ORDER 15 BITS IS ADDRESS OF THE CART THAT IS RESPONDING TO THE POLL REQUEST
→ THIS IS THE ADDRESS OF THE REQUESTING TRANSCEIVER WHO INITIATED THIS POLL REQUEST.
→ VALUE=HEXADECIMAL 81 INDICATES THAT THIS IS A STATUS RESPONSE TO A 01 POLL REQUEST.

| PREAMBLE | FLAG | LENGTH | BLOCK TYPE | REQUESTING TRANSCEIVER ADDRESS | SHOPPING CART ADDRESS & BATT. STATUS | DUMP OF CART DATA LOG | CRC | POSTAMBLE |
|---|---|---|---|---|---|---|---|---|
| 30 BIT-TIMES OF IDLE STATE | 1 CHAR. | 2 CHAR. | 1 CHAR. | 1 CHAR. | 2 CHAR. | VARIABLE NO. OF CHARACTERS | 2 CHAR. | 30 BIT-TIMES OF IDLE STATE |

→ DATA REQUESTED BY THE CHECK-OUT POLLING TRANSCEIVER.

→ TOP BIT INDICATES SHOPPING CART BATTERY STATUS, LOW ORDER 15 BITS IS ADDRESS OF THE CART THAT IS RESPONDING TO THE LOG DUMP.

→ THIS IS THE ADDRESS OF THE REQUESTING TRANSCEIVER WHO INITIATED THIS LOG DUMP.

→ VALUE = HEXADECIMAL 82 INDICATES THAT THIS IS A RESPONSE TO A 02 LOG DUMP REQUEST.

FORMAT OF TRANSMISSION BLOCK SENT BY SHOPPING CART RESPONSE TRANSMITTER TO CHECKOUT POLLING TRANSCEIVER IN RESPONSE TO LOG DUMP REQUEST

| PREAMBLE | FLAG | LENGTH | BLOCK TYPE | REQUESTING TRANSCEIVER ADDRESS | SHOPPING CART ADDRESS & BATT. STATUS | CRC | POSTAMBLE |
|---|---|---|---|---|---|---|---|
| 30 BIT-TIMES OF IDLE STATE | 1 CHAR. | 2 CHAR. | 1 CHAR. | 1 CHAR. | 2 CHAR. | 2 CHAR. | 30 BIT-TIMES OF IDLE STATE |

→ TOP BIT INDICATES SHOPPING CART BATTERY STATUS, LOW ORDER 15 BITS IS ADDRESS OF THE CART THAT IS RESPONDING TO THE CLEAR LOG REQUEST.

→ THIS IS THE ADDRESS OF THE REQUESTING TRANSCEIVER WHO INITIATED THIS CLEAR LOG REQUEST.

→ VALUE = HEXADECIMAL 83 INDICATES THAT THIS IS A RESPONSE TO A 03 CLEAR LOG REQUEST.

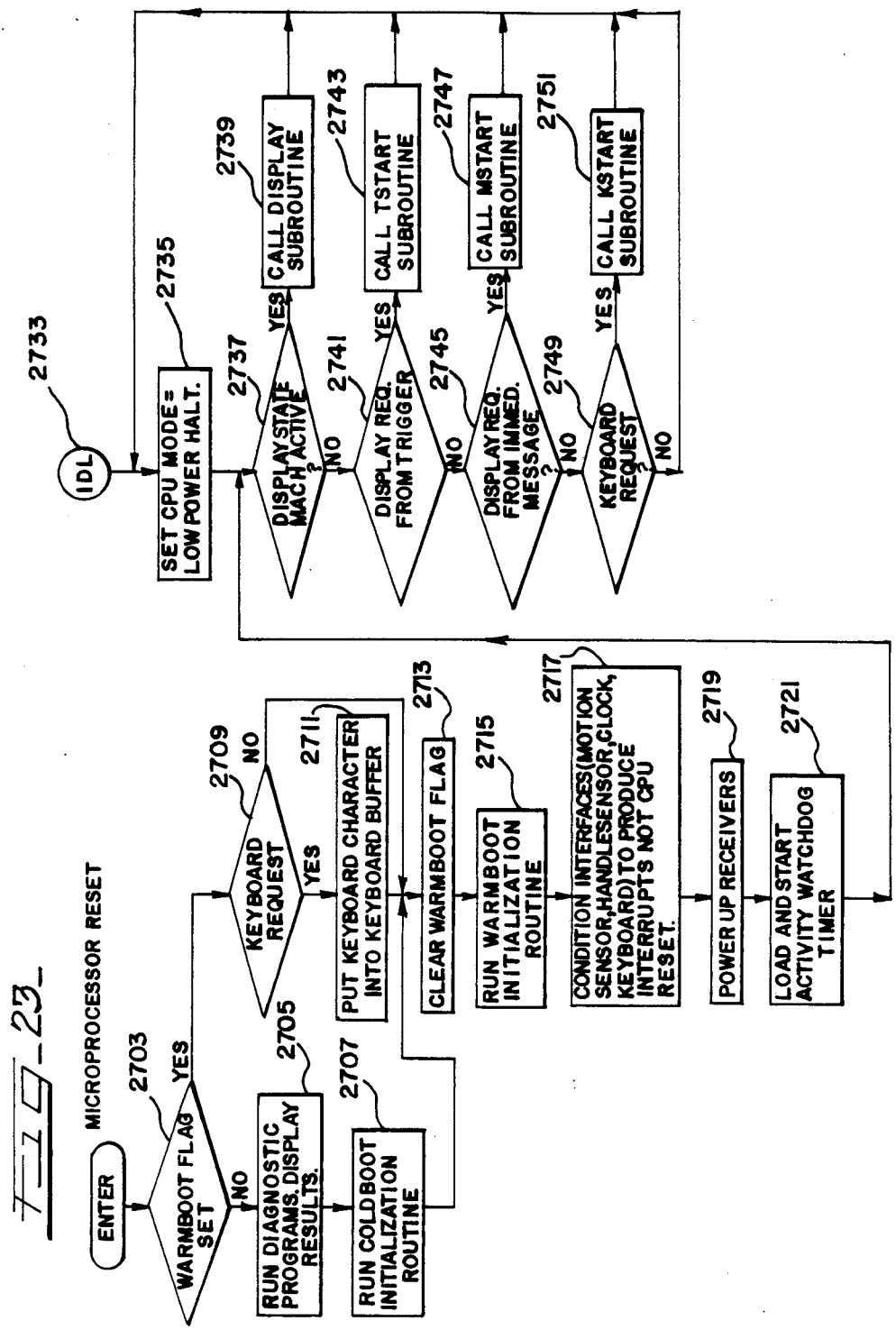

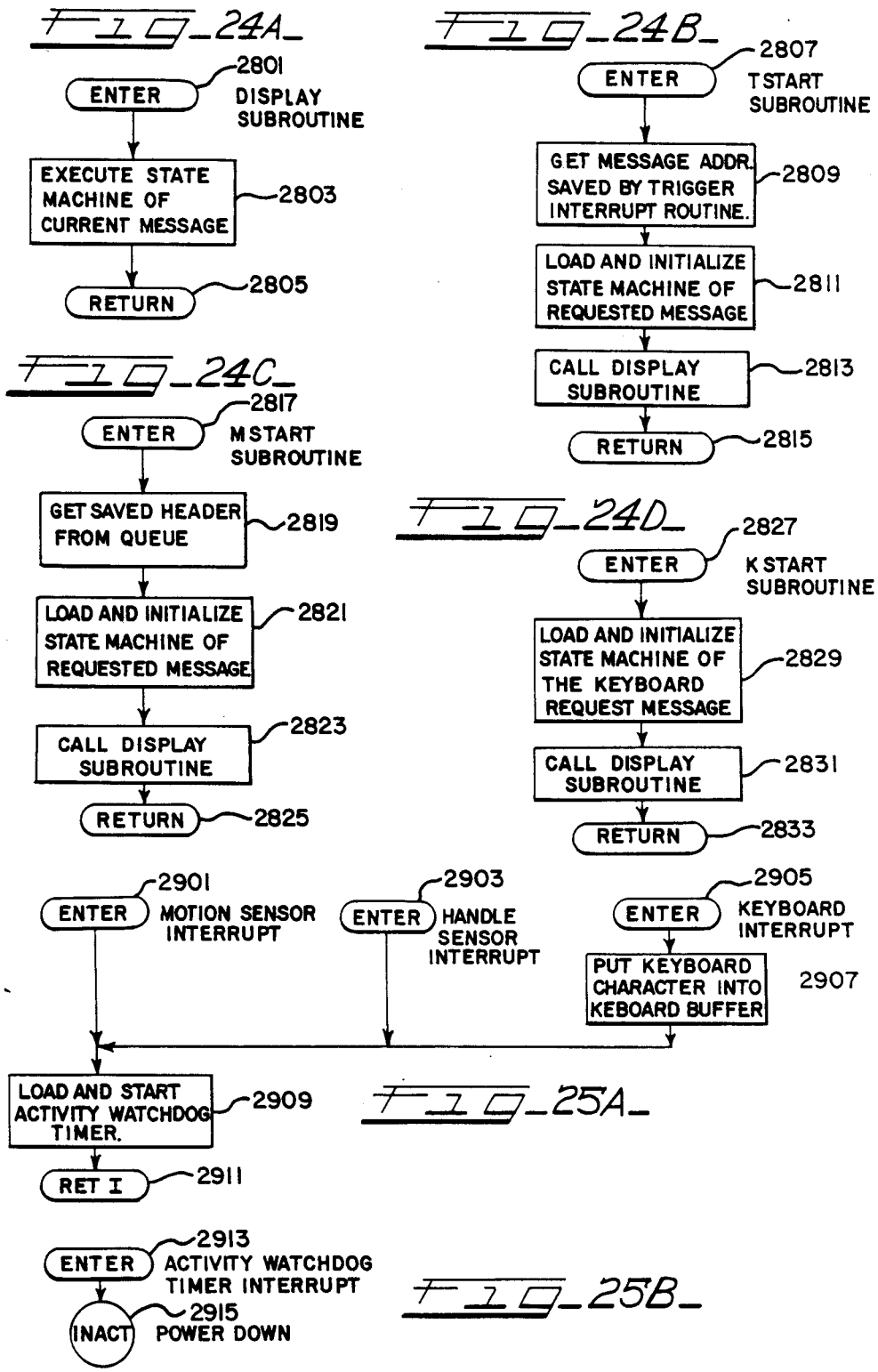

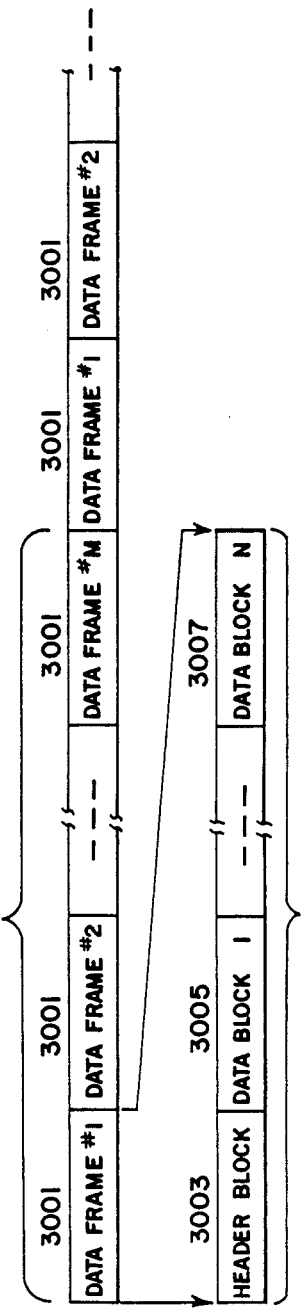

FIG. 26 — REPEATING GROUP OF FRAMES WHICH REFRESH THE MESSAGES STORED IN EACH SCD

EXAMPLE FORMAT OF A TYPICAL DATA FRAME

FIG. 27

| BLOCK TYPE CHARACTER VALUE (HEXADECIMAL) | DESCRIPTION |
|---|---|
| 00 | MESSAGE HEADER |
| 01 | IMMEDIATE 1 MESSAGE HEADER |
| 02 | IMMEDIATE 2 MESSAGE HEADER |
| 03 | CODE SEGMENT HEADER |
| — | |
| 08 | DATA BLOCK WHICH FOLLOWS A MESSAGE HEADER |
| 09 | DATA BLOCK WHICH FOLLOWS AN IMMEDIATE 1 MESSAGE HEADER |
| 0A | DATA BLOCK WHICH FOLLOWS AN IMMEDIATE 2 MESSAGE HEADER |
| 0B | DATA BLOCK WHICH FOLLOWS A CODE SEGMENT HEADER |
| — | |
| 10 | SET CLOCK COMMAND |
| 11 | POWER DOWN COMMAND |

Fig-28-

| 3201 | 3202 | 3203 | 3204 | 3205 | 3206 | 3207 |
|---|---|---|---|---|---|---|
| PREAMBLE | FLAG | LENGTH L=7 | BLOCK TYPE | MESSAGE NUMBER AND VERSION NUMBER | NUMBER OF SUBSEQUENT DATA BLOCKS | CRC |
| 30 BIT-TIMES OF IDLE STATE | 1 CHAR. | 2 CHAR. | 1 CHAR. | 2 CHAR. | 2 CHAR. | 2 CHAR. |

→ VALUE=HEXADECIMAL 00 INDICATES THIS IS A MESSAGE HEADER. EXPECT TYPE 08 BLOCKS TO FOLLOW.

→ VALUE=HEXADECIMAL 01 INDICATES THIS IS AN IMMEDIATE 1 MESSAGE HEADER. EXPECT TYPE 09 BLOCKS TO FOLLOW.

→ VALUE=HEXADECIMAL 02 INDICATES THIS IS AN IMMEDIATE 2 MESSAGE HEADER. EXPECT TYPE 0A (HEXADECIMAL) BLOCKS TO FOLLOW.

→ VALUE=HEXADECIMAL 03 INDICATES THIS IS A CODE SEGMENT HEADER. EXPECT TYPE 0B (HEXADECIMAL) BLOCKS TO FOLLOW.

Fig-29-

| 3301 | 3013 | 3305 | 3307 | 3309 | 3311 | 3313 | 3315 |
|---|---|---|---|---|---|---|---|
| PREAMBLE | FLAG | LENGTH L | BLOCK TYPE | MESSAGE NUMBER AND VERSION NUMBER | NUMBER OF SUBSEQUENT DATA BLOCK | CONTROL INFORMATION AND DATA (DATA IS TRIGGER INFO AND COMPRESSED VIDEO AND AUDIO, OR PROGRAM SEGMENT) | CRC |
| 30 BIT-TIMES OF IDLE STATE | 1 CHAR. | 2 CHAR. | 1 CHAR. | 2 CHAR. | 2 CHAR. | (L-7) CHARACTERS | 2 CHAR. |

→ VALUE=HEXADECIMAL 08, 09, OR 0A INDICATES THAT THE DATA IS PART OF A MESSAGE. THE DATA IS COMPRESSED VIDEO AND AUDIO.

→ VALUE=HEXADECIMAL 0B INDICATES THAT THE DATA IS PART OF A PROGRAM TO BE LOADED INTO MEMORY.

Fig. 30

| 3401 | 3403 | 3405 | 3407 | 3409 | 3411 |
|---|---|---|---|---|---|
| PREAMBLE | FLAG | LENGTH L | BLOCK TYPE | DATA AND CLOCK SET PARAMETERS | CRC |
| 30 BIT-TIMERS OF IDLE STATE | 1 CHAR. | 2 CHAR. | 1 CHAR. | (L-3) CHARACTERS | 2 CHAR. |

→ VALUE = HEXADECIMAL 10 INDICATES THIS IS A SET CLOCK COMMAND TO ALL OF THE SHOPPING CART DISPLAYS (SCDs).

Fig. 31

| 3501 | 3503 | 3505 | 3507 | 3509 | 3511 |
|---|---|---|---|---|---|
| PREAMBLE | FLAG | LENGTH L | BLOCK TYPE | OPTIONAL POWER-UP DATA AND TIME | CRC |
| 30 BIT-TIMERS OF IDLE STATE | 1 CHAR. | 2 CHAR. | 1 CHAR. | (L-3) CHARACTERS | 2 CHAR. |

→ VALUE = HEXADECIMAL 11 INDICATES THIS IS A POWER-DOWN COMMAND TO ALL OF THE SHOPPING CART DISPLAYS (SCDs).

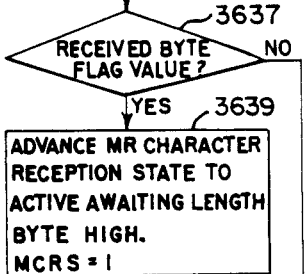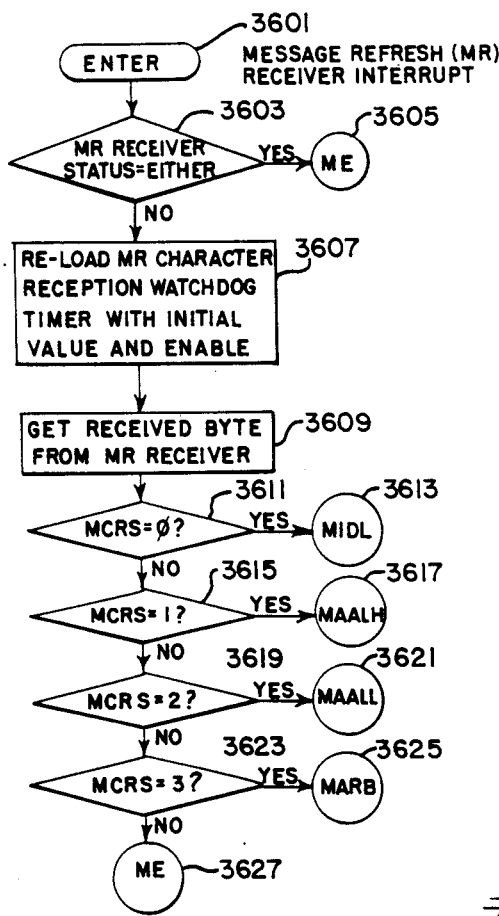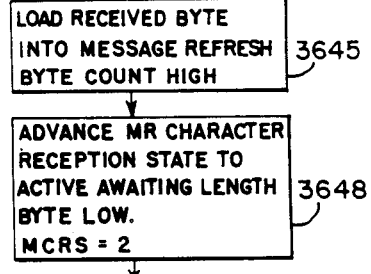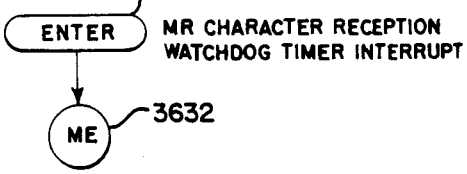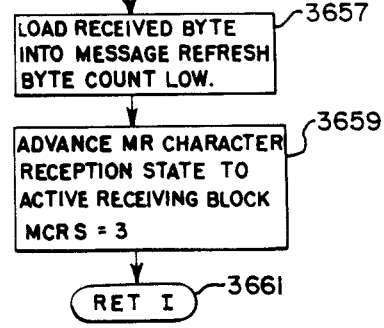

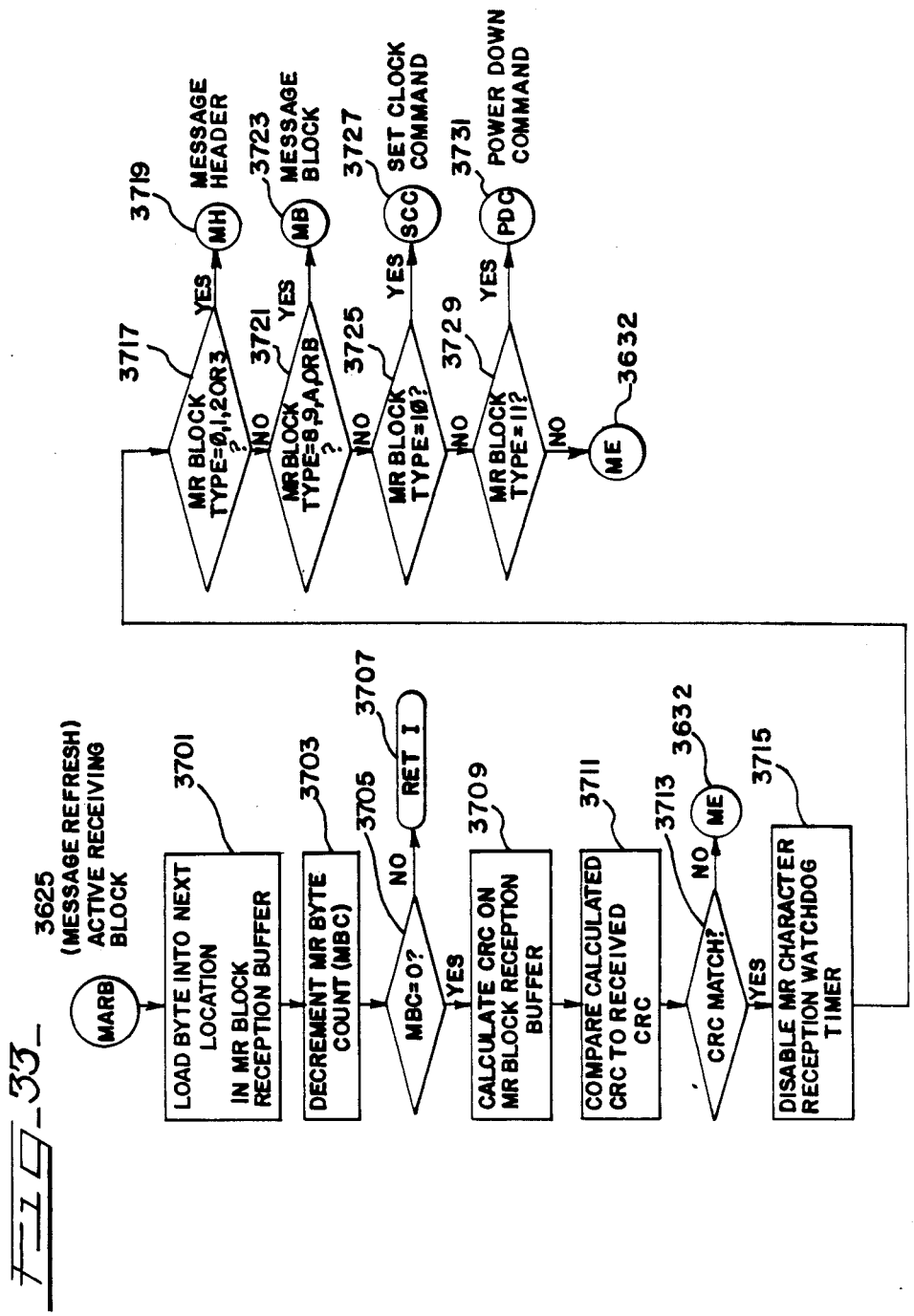

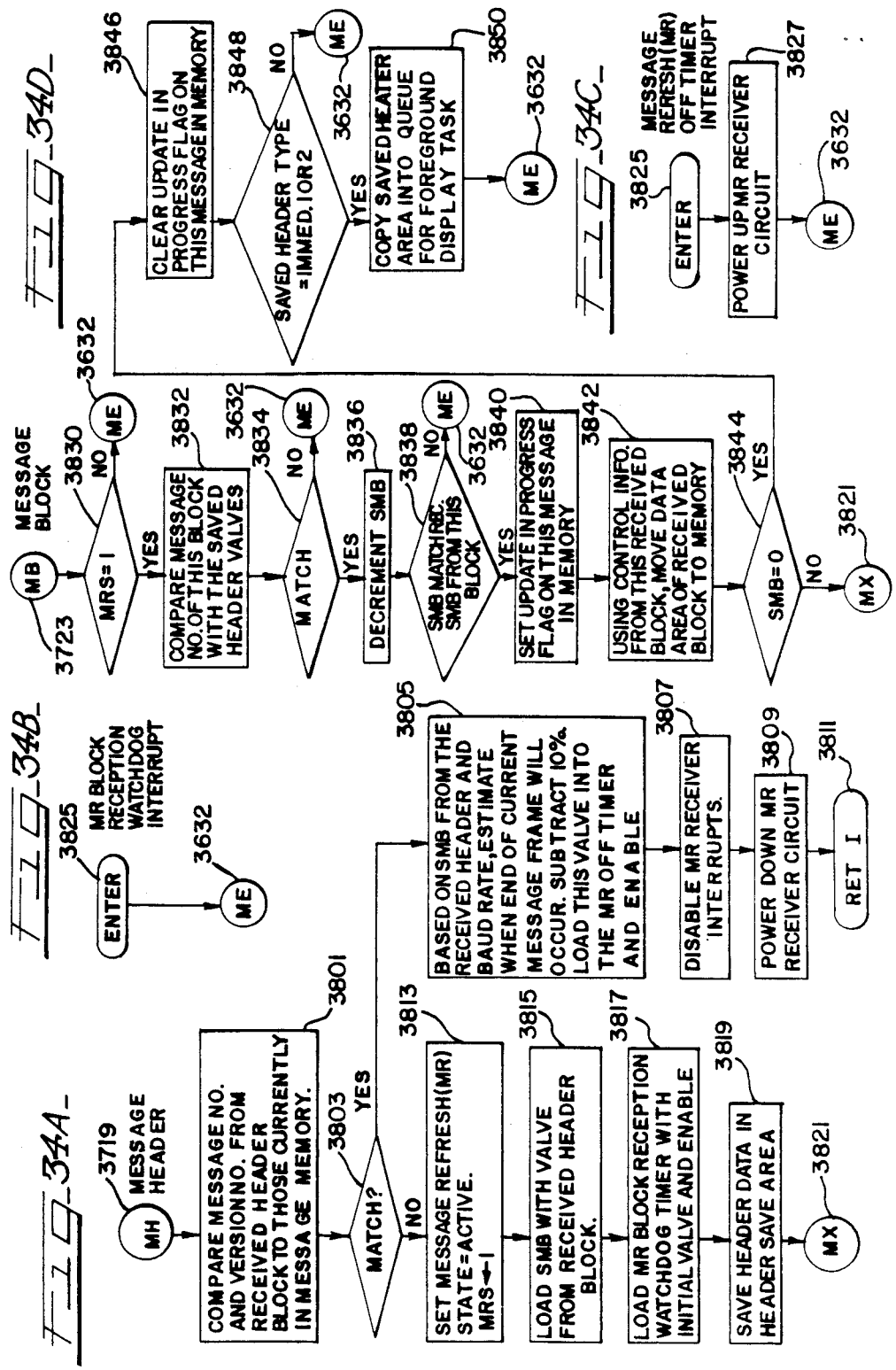

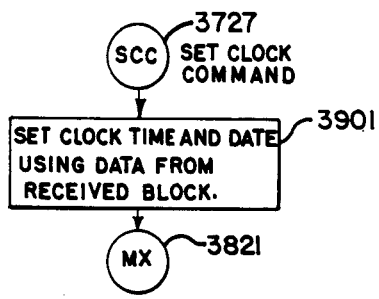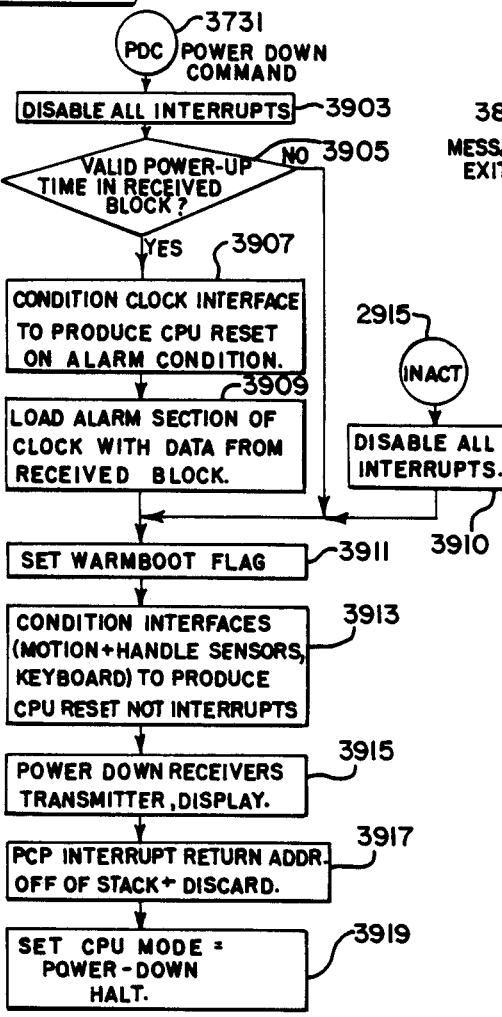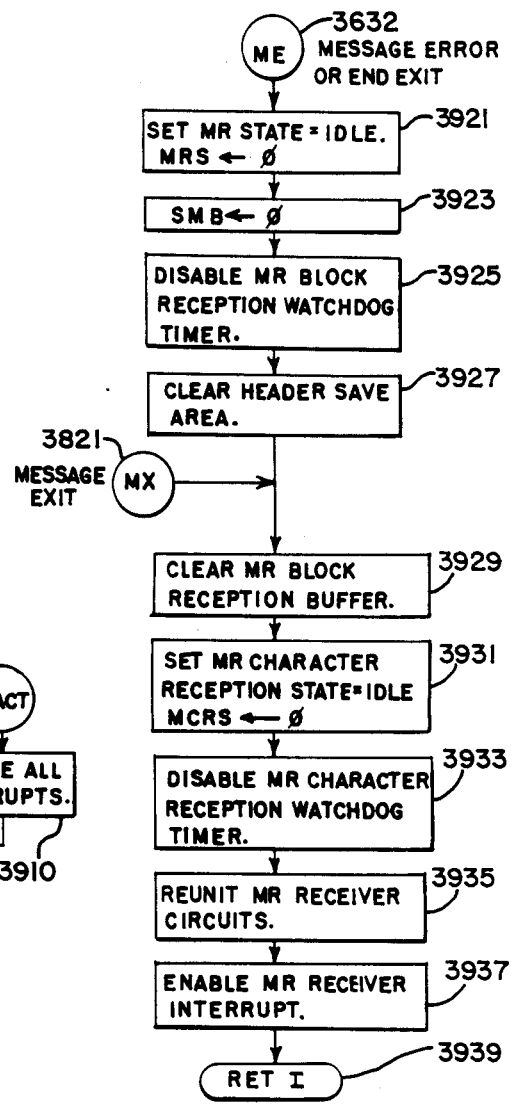

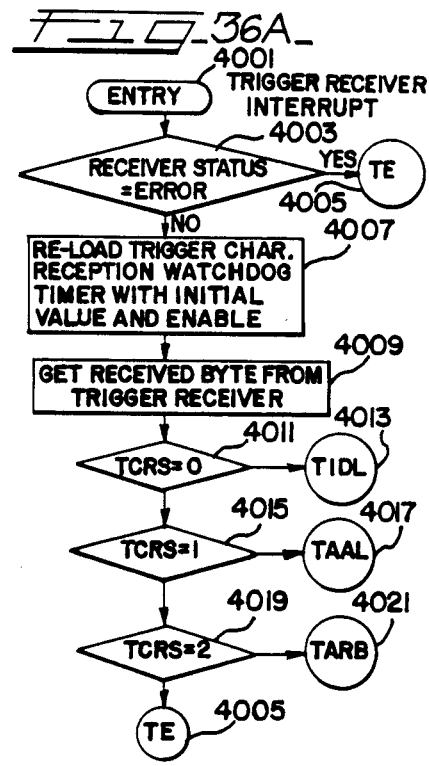
FIG_36A_
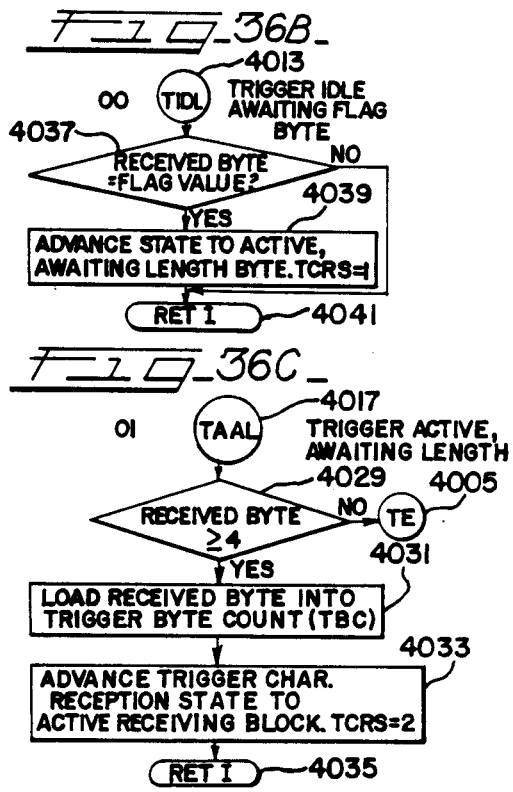
FIG_36B_
FIG_36C_
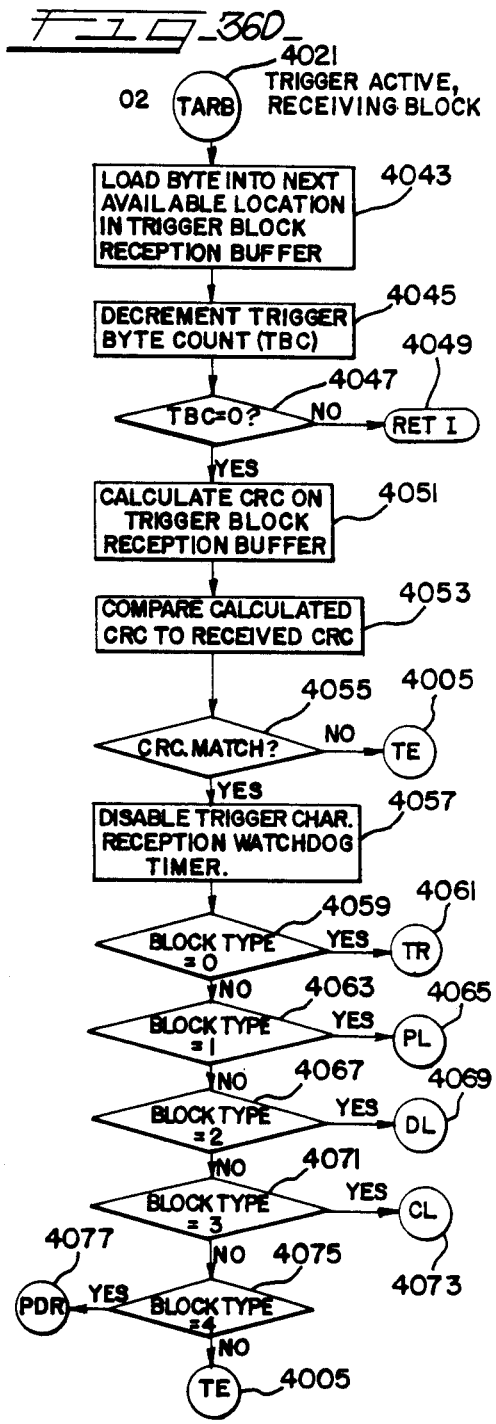
FIG_36D_

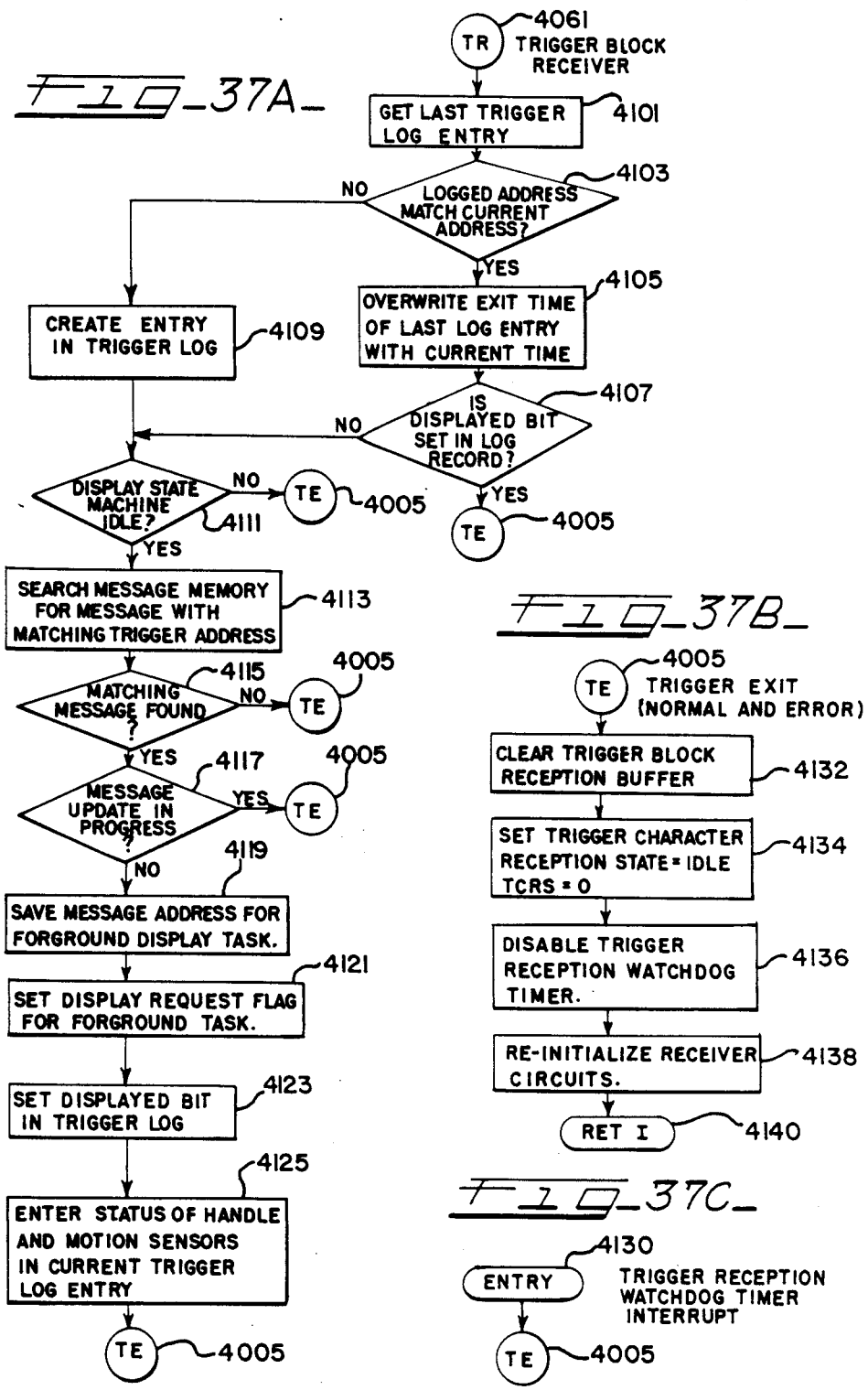

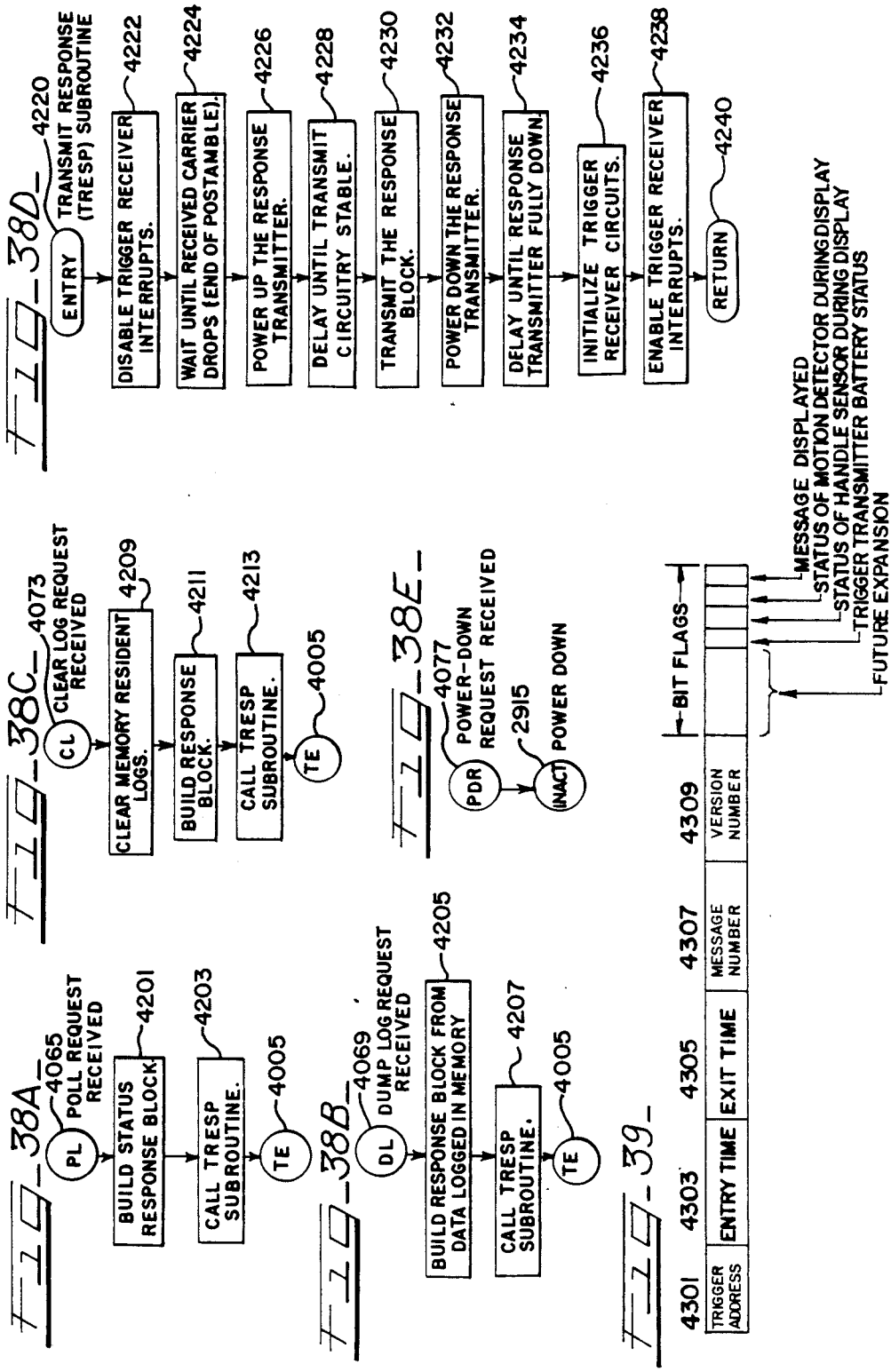

SHOPPING CART DISPLAY SYSTEM

BACKGROUND OF THE INVENTION

Consumer purchasing behavior may be influenced at different times in the purchase-consume-purchase cycle. For example, some grocery stores, in an attempt to influence future purchases, employ video screens located at checkout stations to display advertisements and offer coupons based on the items being purchased by a particular consumer. This type of system has not been entirely successful because the time of the advertisement's maximum influence on the consumer, i.e., during checkout, is temporally furthest from the time that the consumer can respond to the coupon or information. Because the individual consumer has just completed his purchases, it may be a relatively long time before he is in the store again.

Television advertisements, newspaper coupons and feature advertisements also influence the consumer during the middle of the purchase-consume-purchase cycle. Again, the effectiveness of these promotions varies with the time between the consumer's receipt of the promotional information and his next shopping trip.

In-store displays are more effective in influencing consumer purchases since they are encountered more or less contemporaneously with the actual item selection process. One type of in-store display, i.e., point-of-purchase (POP) displays, tend to be physically fixed displays that promote a single product or group of products and must be changed periodically by store personnel, a time consuming and costly task.

Another type of in-store advertisement is the fixed paper placard attached to the front of shopping carts. As with POP displays, the placards must be changed periodically. Effectiveness of the placards is also limited, because they are quickly obscured by groceries as the cart is filled.

It is therefore an object of the invention to provide an advertising system that optimizes the effect of product advertisements by presenting the information just before the consumer is ready to make a purchase and which overcomes the limitations of known in-store promotions.

SUMMARY OF THE INVENTION

The invention overcomes the disadvantages of the prior art by providing the consumer with dynamically changing advertisements and information that influence the consumer at the place and time of product selection.

The Shopping Cart Display (SCD) System is a media system capable of delivering visual and aural messages to a consumer maneuvering a shopping cart through a store. Specifically, an electronic display device mounted on the cart can deliver unique messages depending on the location of the cart in the store. For example, if the consumer is in the bread department, a bread advertisement can be delivered. The display may also be mounted on hand-held shopping baskets present in many stores for those consumers intent on purchasing only a few items. In the presently preferred embodiment, the display has a number of additional features. It can deliver news and information, interact with the consumer to distribute electronic coupons, play electronic games for entertainment and education, or perform convenience functions for the consumer such as budget management.

The electronic messages displayed in the store may originate at a composition workstation located in a remote studio or at a message creation workstation located in the store. The message may contain text, including both still line and pictorial artwork along with full motion video, graphic messages, and audio, including speech, music or attention alert tones. In the presently preferred embodiment, a series of Universal Product Code (UPC) numbers, a unique ad identifier, and other data are included with the message.

The messages are sent from the studio via a communications network to a particular store or series of stores. SCD system computers located in particular retail establishments store messages that are intended for that location. The retailer can also compose and insert local (store specific) ads into the stores SCD computer which transmits the active messages to all of the SCD displays located on the store's carts. Each SCD stores messages for subsequent display.

Throughout the store at various locations are transmitters mounted on the shelves, or where shelves do not exist, on any convenient structure, e.g., hung from the ceiling. Each transmitter radiates a unique electromagnetic signal that causes the SCD electronics to display, either immediately or after a time delay, the advertisement corresponding to that signal. In this manner, the transmitters act as signposts to inform the SCD of its location and orientation. Consequently, a bread ad is displayed while the consumer is in the vicinity of the bread section, and a cereal ad when he is in the vicinity of the cereal section, etc.

The features and advantages of the invention will be further understood upon consideration of the following description of the preferred embodiment taken in conjunction with the drawings, in which:

BRIEF DESCRIPTION OF THE DRAWINGS

FIG. 12 shows the trigger transmitter power cycle.

FIG. 13 shows the format of characters used in the SCD Media system.

FIG. 14 shows the trigger transmitter trigger transmission format.

FIG. 15 is a flowchart of the trigger transmitter software.

FIG. 16 shows the orientation of the trigger transmitter antenna and the trigger receiver antenna.

FIG. 17 is a block diagram of the trigger receiver and response transmitter.

FIG. 19 shows the format of a transmission block sent by the polling transceiver to the trigger receiver.

FIG. 20 shows the format of a transmission block sent by the response transmitter to the polling transceiver in response to a poll request.

FIG. 21 shows the format of a transmission block sent by the response transmitter to the polling transceiver in response to a log dump request.

FIG. 22 shows the format of a transmission block sent by the response transmitter to the polling transceiver in response to a clear log request.

FIG. 23 is a flow chart of the foreground task performed by the SCD microprocessor.

FIGS. 24A-D are flowcharts of the subroutines called during the foreground task performed by the SCD microprocessor.

FIGS. 25A are B are flowcharts of routines performed when a motion sensor, a handle sensor, a keyboard, or an activity watchdog timer interrupt occurs.

FIG. 26 shows an example of a message refresh transmission by the message refresh transmitter.

FIG. 27 shows the message refresh transmitter block type values.

FIG. 28 shows the format of a message refresh transmitter header.

FIG. 29 shows the format of a message refresh transmitter data block.

FIG. 30 shows the format of a message refresh transmitter clock set command.

FIG. 31 shows the format of a message refresh transmitter power-down command.

FIGS. 32A-E are flowcharts of a portion of the message refresh reception software.

FIG. 33 is a flowchart of another portion of the message refresh reception software.

FIGS. 34A-D are flowcharts of another portion of the message refresh reception software.

FIGS. 35A-C are flowcharts of another portion of the message refresh reception software.

FIGS. 36A-D are flowcharts of a portion of the trigger reception software.

FIGS. 37A-C are flowcharts of another portion of the trigger reception software.

FIGS. 38A-E are flowcharts of another portion of the trigger reception software.

FIG. 39 shows an example of a trigger reception log entry.

DESCRIPTION OF A PRESENTLY PREFERRED EMBODIMENT OF THE INVENTION

Figure 1:
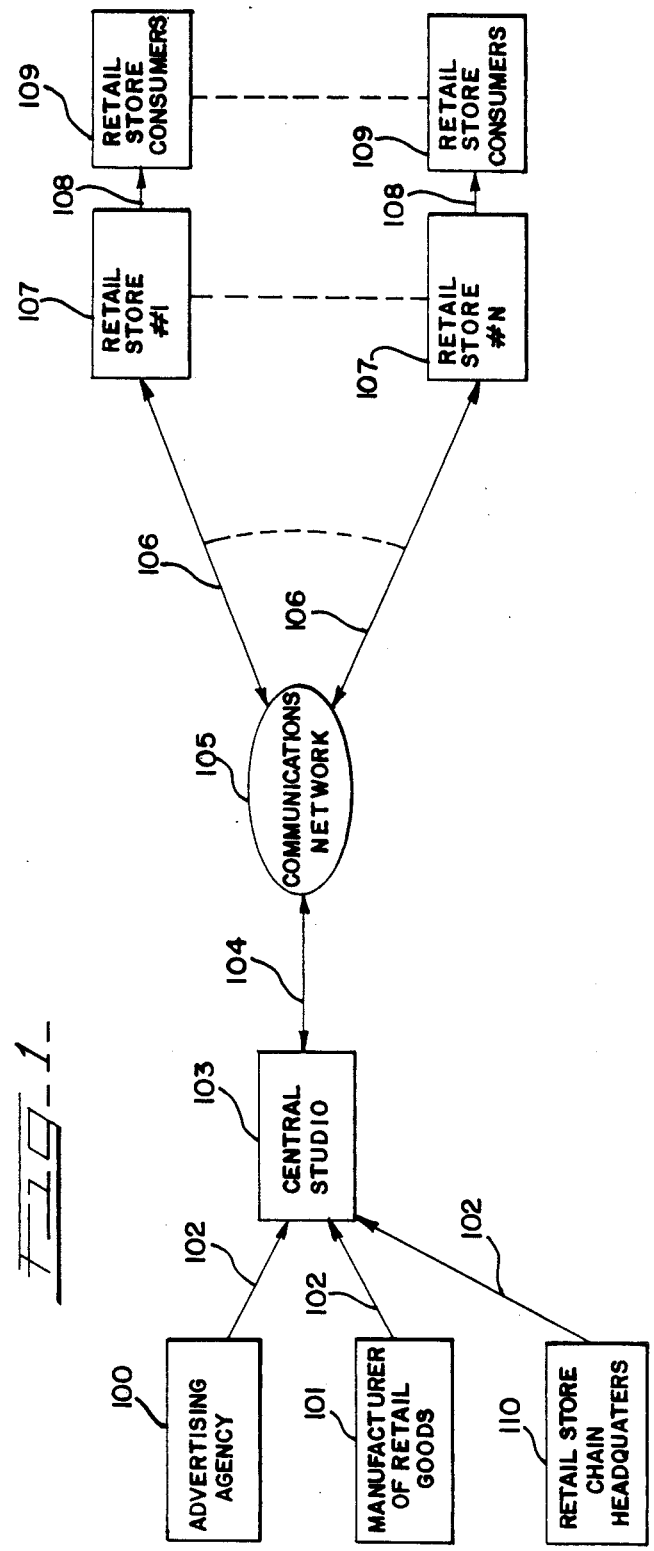
FIG. 1 is a block diagram of a presently preferred embodiment of the SCD Media System.

FIG. 1 is a diagram of the Shopping Cart Display (SCD) Media System. Electronic messages are created on computer workstations located at a central studio 103. Alternatively, the message may be generated at an advertising agency 100, a manufacturer 101, a retail chain headquarters 110, or at any other location that is equipped with a compatible workstation. In this event, the completed ads can be communicated to the central studio 103 via floppy disk, magnetic tape, modem and telephone line, satellite network, etc. 102. Also, workstations may be equipped with a display that simulates the cart-based display electronics. This allows newly created ads to be tested in a real-life situation to judge their visual and aural impact and appropriateness. Additionally, local messages can be created directly at the selected retail store 107. The ability to create ads at the store allows the store manager to insert his own store-specific messages (e.g. store welcome messages, manager's specials, daily specials, close-out sales, etc.).

The central studio 103 attaches additional information to ads received from remote workstations 100, 101, 110 in anticipation of sending the ad over the communication network to a specific store or stores. The information may include the ad "flight" (starting date and time-stopping date and time), a list of store network addresses, the Universal Product Codes (UPCs) or article numbers associated with the ad, and a unique ad identifier.

The message and added data are sent via a bidirectional bus or link 104 to a communications network 105 which may be located in the central studio 103 or elsewhere. The network routes the messages and data over a bidirectional link 106 to an appropriately addressed store or chain of stores 107. The unique addressing allows complete flexibility in distribution of messages. Return data from the stores 107 may be sent back to the studio 103 via the communications network 105 and links 104, 106.

At a particular store, the messages are forwarded to SCD electronics 514 mounted on all product-carrying devices, such as shopping carts and hand-held shopping baskets. Any subsequent references to shopping carts includes all product-carrying devices. The SCD electronics keep the messages in memory. When a cart is in the proximity of a trigger transmitter, an appropriate message 108 is displayed to the consumer 109, either immediately, or after a time delay. The message 108 is determined by the composition of the trigger signal and previously encountered trigger signals.

Figure 2:
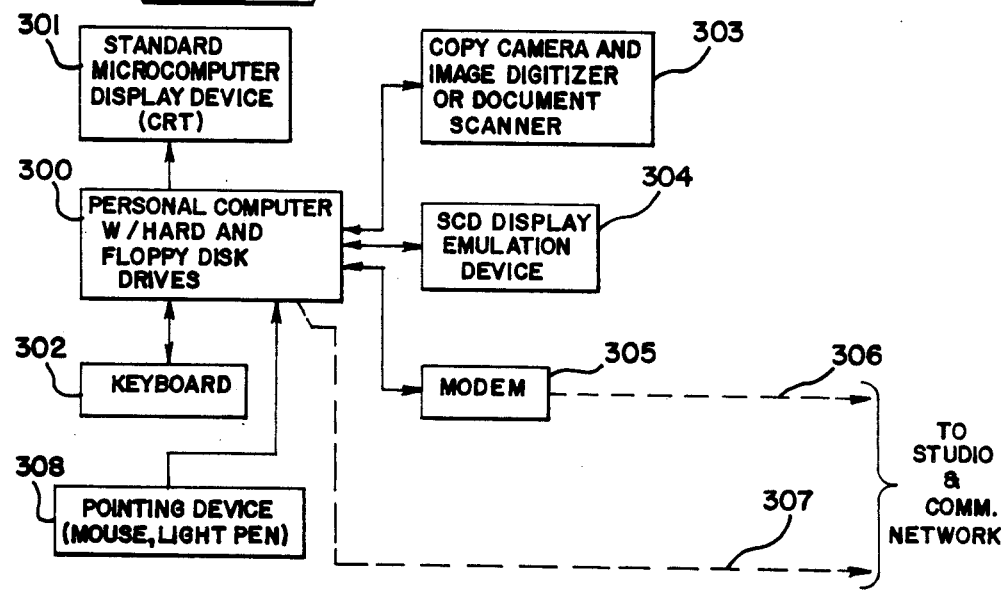
FIG. 2 is a block diagram of the message composition workstation.

FIG. 2 is a block diagram of the message composition workstation located, for example, at central studio 103. It is based on a personal computer 300 with a hard disk drive and at least one floppy disk drive, a standard display device 301 (e.g. a Cathode Ray Tube (CRT)), and a keyboard 302. For ease of graphic image entry, an optional copy camera with digitizer, or document scanner 303 can be attached. For ease of graphic image editing, an optional pointing device (e.g., mouse or light pen) 308 can be attached. An optional display device 304 which emulates the SCD electronics present on the carts in the retail stores may also be attached to the computer 300. The display emulator allows messages to be presented in the exact way that they will ultimately be presented in the store (video and audio). The last optional hardware is a telephone modem 305 that allows networking with a studio billing computer for transfer of completed messages 306. Alternatively, messages may be transferred by manually transferring floppy disks 307 to the studio billing computer.

The software operating on the personal computer 300 preferably includes a graphics image editor which allows composition of graphics and text messages, graphics image capture via copy camera or document scanner 303, graphics animation, audio composition, and image storage and retrieval. The software also includes a program for driving the display emulation hardware, and for compressing the completed messages before transmission via floppy disk 307 or modem 305, 306. Messages can be compressed via several means: one dimensional run length encoding or two dimensional Relative Element Address Designate (READ) coding (similar to the CCITT Group III and IV digital facsimile standards); conversion to North American Presentation Level Protocol Syntax (NAPLPS); conversion to PostScript or PreScript; conversion to Initial Graphics Exchange System (IGES); conversion to Electronic Design Interchange Format (EDIF); or conversion to the Graphic Kernel System (GKS).

Figure 3:
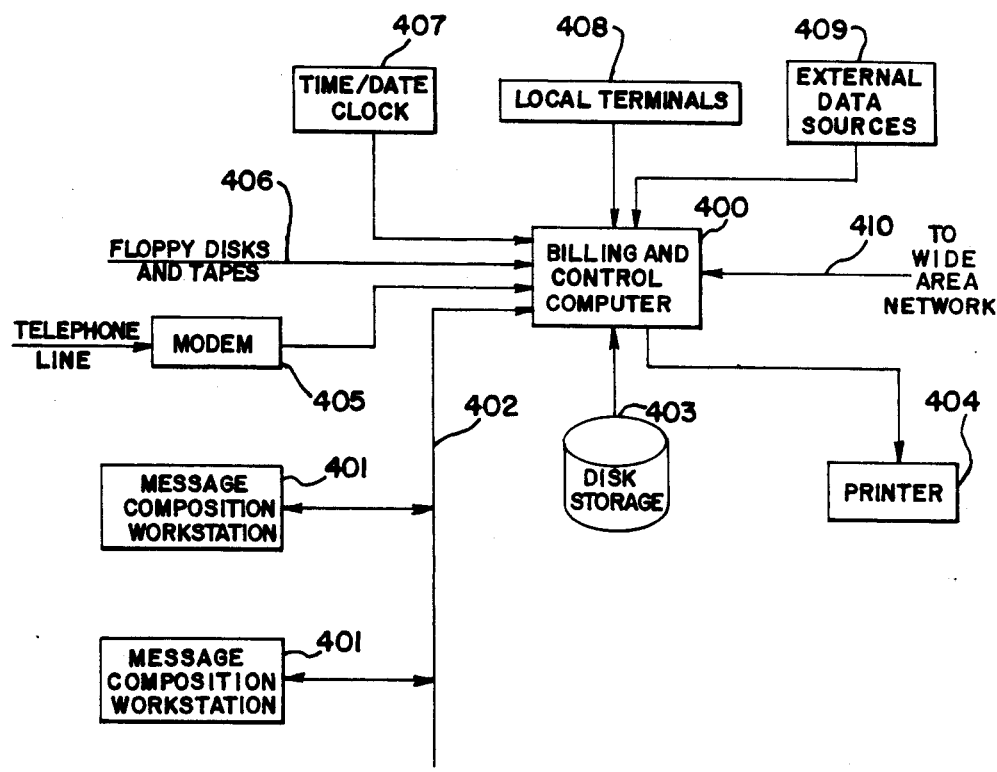
FIG. 3 is a block diagram of the studio and billing control computer.

FIG. 3 is a more detailed diagram of central studio 103 and an associated billing computer system. The studio includes a series of message composition workstations 401 tied together in a known manner with a Local Area Network (LAN) 402 to facilitate production of SCD system messages. The LAN 402 connects all of the work stations to the billing and control computer (BCC) 400. After messages are composed, they are transmitted to the BCC. Messages composed at off-site work stations are received via telephone modem 405, floppy disks and magnetic tapes 406. Other inputs to the BCC are time and date via a radio-coordinated clock 407, local terminals for advertising account executives 408, and external data sources 409 such as United Press International, Dow Jones data services, Silent Radio, etc. The BCC has local disk storage 403 and printer facilities 404.

The BCC operating software accepts SCD system messages, attaches additional data to the messages from the local data base, prints acknowledgments of the messages for verification of off-site clients and account executives, and, based on information retrieved from the data base, forwards the messages on for distribution to the stores via a Wide Area Network (WAN). The messages are also logged for client billing and collections purposes.

Several cycles of start and stop dates and times can be loaded into the data base of the BCC to automatically schedule an advertisement's "flight" and "hiatus" durations. This can be loaded via the workstations or the local terminals by the account executives.

The data base resident on the BCC also contains games and information that is periodically downloaded via the WAN into computers located in the stores and subsequently into the display devices on the carts. The BCC software also accepts data returned from the stores to the studio via the WAN.

The WAN may be constructed of many technologies or combinations thereof such as direct satellite links, terrestrial microwave links, Multiple Address System (MAS) radio frequency links, subcarrier links from FM broadcast stations, fiber optic links, laser optical links, Integrated Services Digital Network (ISDN) offered by phone companies, T1 service offered by phone companies, dedicated phone lines with modems, dedicated phone lines with line drivers, conventional non-dedicated dial-up telephone lines with modems, or other means, as technology advances.

The WAN routes individual messages to the individual retail stores or groups of stores based on addressing information contained in the messages and the store address loaded into each of the SCD in-store computers. Each store has a unique address. The address consists of two parts, a chain address and a store address within that chain. The WAN also handles broadcast messages (i.e. messages that are to be received in all stores connected to the WAN.) The time and date are examples of messages that may be received by all of the stores.

The WAN also routes return information from the stores to the studio in a manner known in the art.

Figure 4:
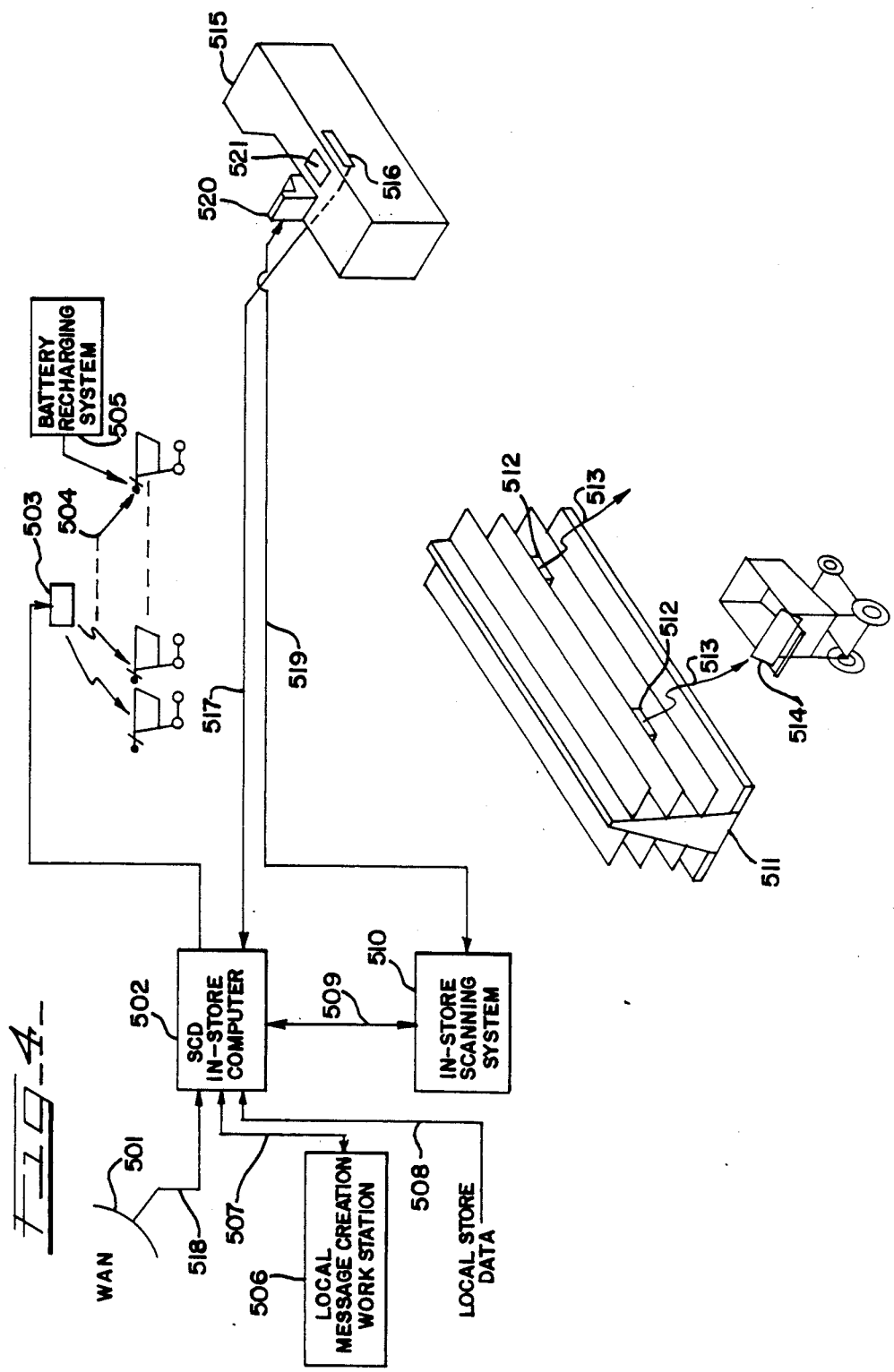
FIG. 4 is a diagram of the in-store components.
Figure 5:
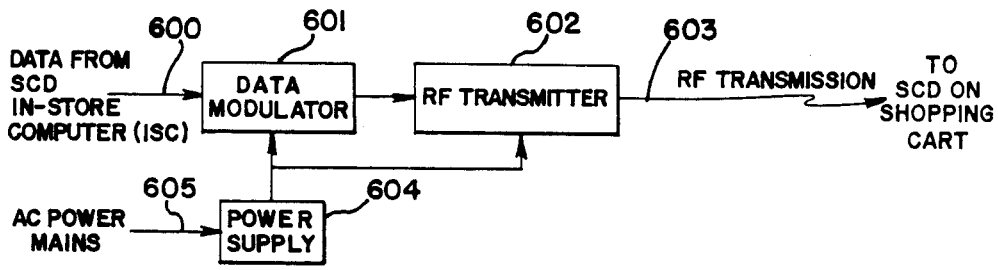
FIG. 5 is a block diagram of the message refresh transmitter.

FIG. 4 shows the in-store components of the SCD System. The communication device 501 interfaces to the Wide Area Network. FIG. 5 depicts the communication device as a satellite dish for interfacing with a satellite-based WAN. Whatever hardware or transmission link is used, device 501 would include associated demodulating circuitry to convert the incoming signal into computer readable form. If the WAN is to be bidirectional, device 501 must also include modulation and transmitting capabilities. Devices of this type are well known in the art. Messages for the store 107 arrive on link 518.

The SCD System In-Store Computer (ISC) 502 compares the address of each message to its own unique address. If the address matches or if the message is a broadcast transmission which is destined for all stores, the ISC accepts the message and optionally spools it to local nonvolatile storage such as batterybacked Random Access Memory (RAM) or disk.

A message that is to be displayed on the SCD electronics 514 is merged with data from the local data base present in the ISC. This data base contains trigger transmitter (TT) 512 shelf location information. This data base is kept current by store personnel. The Universal Product Codes (UPCs) or article numbers associated with the message may be checked via the in-store scanning system 510 to ensure that the advertised products are present in the store.

Locally generated messages may be created by a local workstation 506 (optional) and transferred to the ISC 502 via link 507. This allows the store manager to create a message to welcome shoppers to his store, and advertise the stores monthly, weekly, daily or hourly special, along with any special promotions in the meat department, delicatessen, bakery, etc. The store manager edits a data base in the ISC to control the locally generated ads' flight and hiatus.

Other local store data can be input to the ISC 502 via the link 508. In the preferred embodiment, the ISC contains a "product look-up" table that enables consumers to find a particular product by making the appropriate selection at the SCD electronics keyboard. In addition, data showing which ticket number is currently being served in the deli, the winning state lottery numbers for the day, and local news or financial information may also be displayed on all the carts in the store. Public service information such as weather warnings, may also be entered into the ISC and transmitted to the SCD's. Other uses including ones similar to an audio public address system may be made of the SCD. In addition, the SCD's provide an interactive store directory.

To make the wait in line at the checkout counter appear shorter, the SCD can be used to play games. Trivia games, brain teasers, hangman, etc. can be played. The games are loaded in the ISC via the WAN or locally via the composition workstation 506. Consumers interact using the cart-based display and overlaid keyboard described below.

All data required for SCD system operation is sent storewide by the ISC to the SCD electronics 514 present on all the carts by the Message Refresh Transmitter (MRT) 503. The MRT transmits radio signals containing the messages (depicted at 504). A Message Refresh Receivers (MRR) Subassembly 1317 (FIG. 13) on each of the carts 514 receive the message signals from the MRT. The signals are then converted into digital messages. If the messages are to be displayed only when triggered, they are stored in a memory in the cart. If the messages are for immediate display and the cart is active (recently in motion) the message is uncompressed and displayed.

Mounted below the shelves are a large number of Trigger Transmitters (TT) 512 located throughout the store in all categories and departments. In aisles where shelves are not present (i.e. soda pop, meat, frozen foods, etc.) TTs can be hung from the ceiling or otherwise located in the vicinity of the product. TTs transmit at a very short (approximately 1%) duty cycle to conserve their battery power. Each TT in a given store has a unique address which it transmits as part of its trigger message.

When the SCD cart-mounted electronics 514 receive a valid trigger transmission 513 of adequate amplitude (i.e. the cart is within the trigger transmitter zone), it searches its memory for any message with the corresponding trigger address. If an address match is found, the message associated with that address is displayed either immediately or after a time delay. This is how a bread message (advertisement) is displayed in the vicinity of the cereal section, etc. In the presently preferred embodiment, the SCD electronics 514 log all received triggers and the displayed message directs the consumer's attention to the left or right depending upon which trigger signals have previously been encountered.

The SCD electronics 514 stores every valid unique trigger transmission and the date and time that it receives it as the cart traverses the store to form a log of all the places that the cart has been. This log is uploaded to the In-Store Computer 502 during checkout at point-of-purchase station 515. Located at the station 515 is a polling transceiver 516, the electronics of which are identical to the SCD transceiver electronics 514 except that the data processing is done by the ISC computer 512 which receives data from transceiver 516 via link 517. The log is then cleared in anticipation of the next shopping trip. The data is merged with the Trigger Transmitter location information and up loaded to the studio for analysis.

Consumer surveys can be conducted via the SCD system. System messages in the form of questions are composed and transmitted to the SCD electronics. Consumer responses are entered on the keyboard and logged in memory on the cart. These responses are up loaded from the cart to the ISC during check-out time 515, 516, 517 and ultimately returned to the studio.

The Trigger Transmitters (TT) 512 are easily attached and removed from the shelves. This facilitates easy TT exchange, relocation and battery replacement by store personnel. When the items on the shelves are relocated, the TTs must be relocated also. Store personnel must keep the TT location data base resident in the ISC 502 up to date.

Batteries in the SCD cart-based electronics are recharged by a battery recharging system 505. This can be accomplished, for example, by an inductive pick-up (electric transformer secondary coil) mounted in the cart. A corresponding inductive transmitter (electric transformer primary coil) can be mounted in the cart storage area. When the cart is in storage, recharge energy will be magnetically transferred to the cart. An electrical contact could also be used to transfer energy into the cart. While in storage, an electrical contact mounted on the cart would connect with a corresponding contact mounted in the storage area to transfer energy. Photovoltaic cells (i.e. solar cells) can provide recharge energy via ambient light, sun light, and auxiliary lighting placed over the cart storage area. A wheel generator could also be employed to convert energy from the motion of the cart.

In the presently preferred embodiment, the discharged battery packs are easily removed and exchanged with recharged ones by store personnel. The spent packs are placed in rechargers in anticipation of the next exchange.

FIG. 5 is a block diagram of the Message Refresh Transmitter (MRT) 503 which receives data stream 600 from the SCD In-Store Computer (ISC) 502. The MRT consists of frequency shift keyed (FSK) modulator 601, this modulates the incoming data in a manner known to the art at VHF frequencies. The modulated signal is transmitted throughout the store by an RF transmitter 602. The MRT VHF Transmissions are authorized under FCC Part 90.267 "ASSIGNMENT AND USE OF 12.5 KHZ FREQUENCY OFFSETS". Since the MRT is continuously transmitting to refresh the message stored in the carts, batteries will not work as a power source for the MRT. It is powered by the alternating current (AC) power mains 605 via power supply 604.

Alternatively, the MRT transmissions 603 could be via low-frequency radio-frequency (LFRF) transmissions, microwave radio-frequency transmissions, or infra-red (IR) transmissions, or other FCC Part 90 authorized transmissions.

FIGS. 26, 28 and 29 show an example of an MRT data transmission. The MRT continuously repeats a series of data frames 3001. Each data frame consists of a header block 3003 and a series of data blocks starting with block 1 3005, and ending with block N 3007. The header includes idle time 3201 followed by a flag byte 3202, and a length indicator 3203. The length indicator tells how long the complete header block is. Next comes a block type indicator 3204. It indicates whether the next data is part of a header block 3003 or a data block 3005, 3007. Next an SCD message number and version number 3205, an indicator of the number of subsequent data blocks 3206, and finally an error detection check sum or cyclic redundancy check (CRC) 3207 for verifying the integrity of the block.

The SCD cart-based electronics 514 listens to the header and makes a decision during the idle time 3301 following the header 3003 a part of the following data block 3005. It first computes the check sum or CRC for the header and compares it to the transmitted check sum or CRC 3207 to determine that the header is valid and error free. If the header is valid, the SCD then checks the message number and message version 3205 against the message version numbers it has stored in memory already. If there is a match, the SCD has previously stored the message that is in the following data blocks 3005, 3007 of the current frame. The SCD can turn off the Message Refresh receiver and "go to sleep" (to save battery life) during the remainder of this data frame. It knows how many data blocks are in the current frame from the header information 3003. It can measure the transmission rate and calculate the time duration of the rest of the current data frame. It then sets and starts a timer that will "wake up" the SCD electronics in time to read the next header. This minimizes the power consumption of the cart-based electronics to maximize battery life.

If the message number and version number do not match any message numbers or version numbers in memory, the SCD reads and validates the remaining data blocks 1 3005 through N 3007 of the current frame and loads them into memory. It then continues with the next data frame and header.

Figure 6:
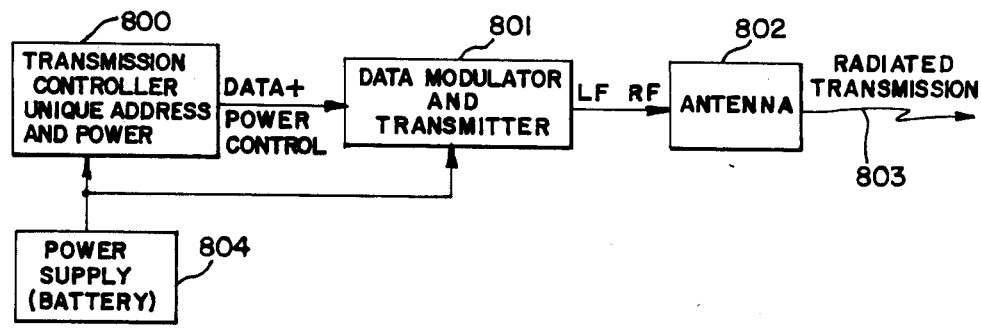
FIG. 6 is a block diagram of the trigger transmitter.

FIG. 6 is a block diagram of the Trigger Transmitter (TT). The Transmission Controller 800 contains a unique TT address, and a power sequencer. The data modulator and transmitter 801 generate modulated low-frequency radio-frequency (LFRF) energy that is coupled to the antenna 802.

All antennas generate both an electric (E) and magnetic (H) field. In the far field (approximately 5 wavelengths away from the antenna) the E and H fields obey a fixed relationship that is independent of the type of antenna. In the far field region, the energy falls off as an inverse function of the distance squared. In the near field (less than 5 wavelengths), the energy falls off as an inverse function of the distance cubed. The presently preferred embodiment operates in the near field to take advantage of the inverse cubed rolloff in energy to control the size of desired zone vs the zone of interference to adjacent trigger transmitters. In particular, the system employs a small loop antenna 802 which acts like a magnetic dipole to create a large H near field component. A similar magnetic loop 2101 antenna mounted within SCD electronics 518 is employed to receive the signal. In this way the two antennas are coupled not unlike the primary and secondary coils of a transformer when they are close to each other. (See FIG. 20.)

The cart-based receiver responds primarily the magnetic component of the field 803. When the cart receiver antenna coil is in proximity of the transmitter antenna coil, the coils are magnetically coupled and act as a transformer. The transmitter coil acts as the primary winding and the receiver coil acts as the secondary winding. Both coils are oriented with their main axis in the vertical position for more rapid dropoff of the coupling.

FIG. 14 shows an exemplary Trigger Transmitter (TT) message. Most of the time the transmitter is powered down to conserve battery energy. The transmission controller 800 is always powered up and running. After a predetermined off time, for example 5 seconds, the transmission controller 800 powers up the data modulator and transmitter 801 and begins transmitting the idle 1802. During the idle 1802 the transmitter circuits and the receiver automatic gain control circuits (AGC) stabilize. By the end of the idle 1802, the receiver is ready to receive message data. Next a preamble 1804, a flag indicator 1805, a length indicator 1806, a block type indicator 1807 (indicating that this is a trigger block), a unique trigger transmitter address and battery status indicator 1808, and a CRC for message validation 1809 is sent. Then a postamble (i.e. idle) 1810 is sent. The trigger block 1803 is repeated three more times. At the end of 1810, the transmission sequencer 800 powers down the data modulator and transmitter 801 and begins timing the off duration again. When the time-out elapses, the whole message sequence is repeated.

During the Trigger Transmitter idel 1802, the cart-based receiver AGC stabilizes and the received signal strength is measured against an adaptive reference based on the AGC voltage. If the signal strength is below the reference, the rest of the message is ignored. If the signal strength is above the reference, the receiver output is gated on and the cart-based central processing unit (CPU) is interrupted ("woken up") to begin message reception. The CPU receives the trigger transmitter address 1808 and the CRC 1809. It then validates the data by calculating the check sum or CRC and comparing it to the received value 1809. If the data is not valid, the CPU ignores the Trigger Transmitter message. If the data is valid, the CPU searches it memory for any message that has the received trigger address 1808 associated with it. If a match is found, the associated message is displayed to the consumer who is pushing the cart. As explained later, the message displayed may include a component that is dependant upon the triggers previously received. If no match is found, no message is displayed.

Regardless of whether a match is found, all valid trigger transmissions received by the cart are logged in memory, along with the time and date of reception. This allows the path, speed, direction etc. of the cart to be tracked by cart-based software. This allows messages to be selectively displayed based on the consumer's path through the store.

During check-out, the information logged in SCD memory is up loaded to the In-Store Computer and ultimately up loaded over the WAN to the Billing and Control computer in the studio. This data can be analyzed to determine how the store aisles are traversed by the consumers, dwell time in each category, overall shopping trip duration, etc.

Figure 11:
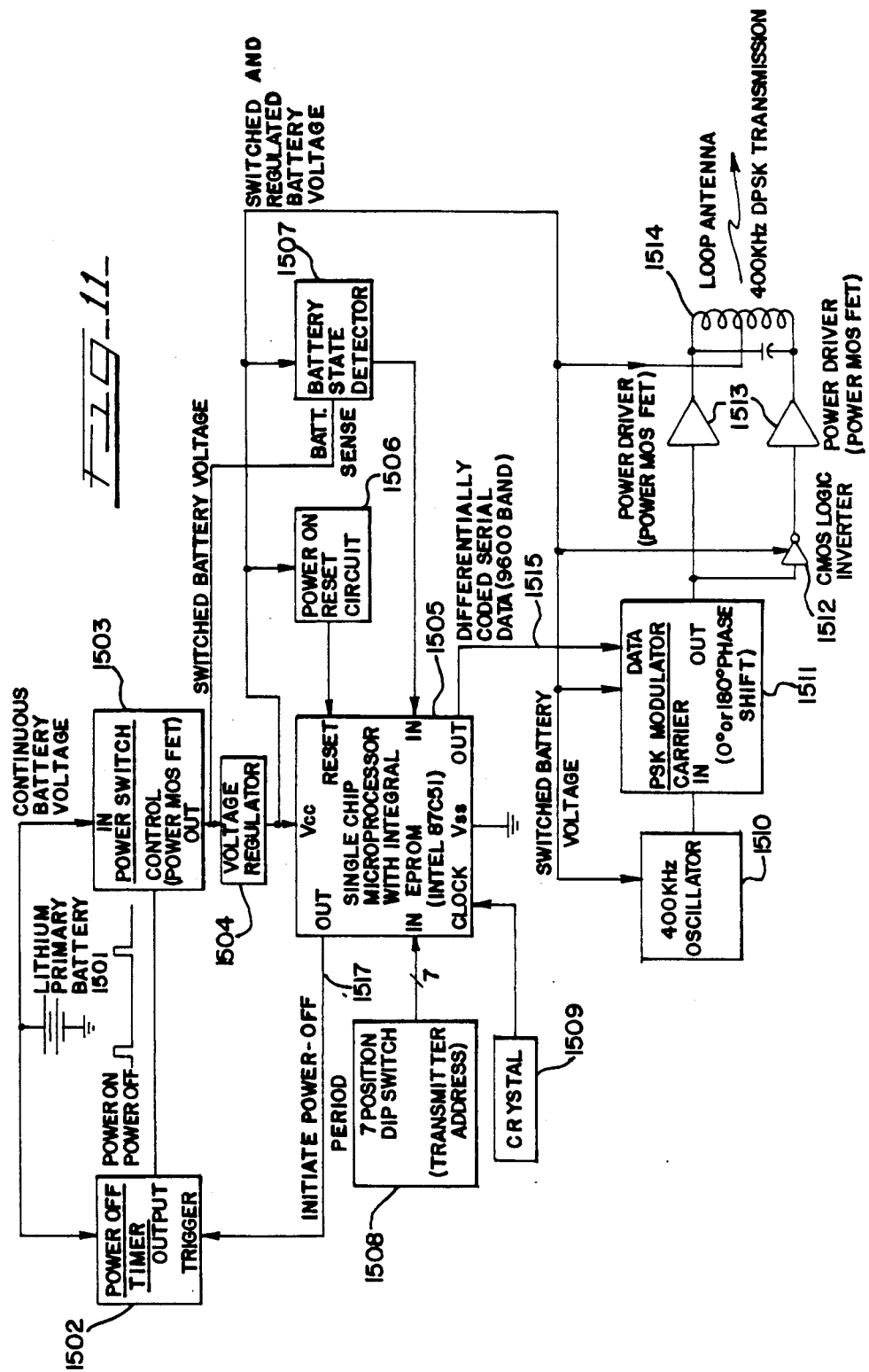
FIG. 11 is a detailed block diagram of the trigger transmitter.

FIG. 11 shows the trigger transmitter in detail. The trigger transmitter is designed to consume minimal power. This is to maximize the service life of the battery 1501. The only part of the transmitter which has continuous power is the power-off timer 1502. Its output signal is low for approximately 5 seconds and then it goes high. This high signal activates power switch 1503 (a power MOS FET) which allows battery power to be applied to the voltage regulator 1504 and the battery sense input of the battery state detector 1507. The voltage regulator 1504 supplies power to the remainder of the trigger transmitter circuitry. On power-up, the reset circuit 1506 holds the microprocessor 1505 in the reset condition until the power is stable and the microprocessor clock 1509 is stable. The microprocessor 1505 then begins executing the software detailed in FIG. 19. The microprocessor 1505 is an 87C51 type manufactured by Intel Corporation. It contains an on-chip program storage which is implemented as an Erasable Programmable Read Only Memory (EPROM). The program is loaded into the EPROM at the time of manufacture of the trigger transmitter.

The battery state detector 1507 compares the switched battery voltage 1516 against its internal reference voltage. If the voltage is above the reference a logic 1 is returned to the microprocessor. If it is below the reference a logic 0 is returned to the microprocessor.

When the battery voltage is below the reference, the battery is nearing the end of its life. Store personnel must be alerted to replace the battery before it fails. The battery status and trigger transmitter address are communicated by the trigger transmitter 512 to the electronics 514 on all shopping carts as they pass by. As the shopping carts go through the check-out lane, they are polled by the polling transceiver 516. This information is passed on to the ISC 502 by link 517. Once a day or on demand, the ISC prints a list of trigger transmitters that have low batteries so that store personnel can service the batteries in the transmitters.

The 400 KHz oscillator 1510 provides a carrier to the Phase Shift Keyed (PSK) Modulator 1511. The PSK modulator 1511 either passes the carrier signal through with no change or it provides a 180 degree phase shift, under control of the data input signal 1515 provided by the microprocessor 1505 to the modulator 1511. The logic inverter 1512 and the two power drivers 1513 (each a power MOS FET) provide current gain and complementary drive to the loop antenna 1514. The antenna 1514 is resonant at 400 KHz.

The Dual In-line Package (DIP) switch 1508 provides 7 Single Pole Single Throw (SPST) switches. The switches are set by personnel in a binary fashion to indicate the address of the Trigger Transmitter. The trigger address is sent as a part of the trigger transmissions to the shopping cart. Each Trigger Transmitter has a unique address which indicates a unique location within the store.

FIG. 12 shows the trigger transmitter power cycle. At point 1601 the power-off timer 1502 is running and power to the rest of the transmitter is off. At point 1602 the timer completes its timing cycle and powers-up the rest of the transmitter circuitry. At point 1603, after the power-up reset cycle is complete, the microprocessor 1505 begins execution of its software. To provide forward error correction and establish reliable communications, the software transmits the trigger block 1803 redundantly 4 times. This is to overcome any possible noise present in the store that may interfere with the trigger transmissions. The shopping cart only needs to receive one of the trigger blocks 1803 error free to act (i.e. display a message to the consumer if there is a message with the matching trigger address present in the shopping cart memory). At point 1604 the software has completed its transmission task and now it toggles a bit 1517 high and then back to low on one of its output ports. This triggers the power-off timer circuit 1502 which removes power to all of the rest of the transmitter circuitry for the next 5 seconds. The trigger input to the power-off timer is pulled down by a resistor so that while the microprocessor is powered-down spurious triggers do not occur. The power-up to power-down duty cycle is approximately 1 percent.

Area 1605 shows a failure in which the microprocessor 1505 is hung-up and never re-triggers the power-off timer 1502 after completing its transmissions. This could be due to some transient event (i.e. electrostatic discharge). In this case, the power off timer circuitry 1502 drops power to the rest of the transmitter circuitry after a short time, preferably twice the typical power up time 1603. This resets the microprocessor 1505 and allows the normal power cycle to resume.

FIG. 13 shows the format of each character transmitted by the trigger transmitter, the response transmitter, and the message refresh transmitter. Each character that is transmitted by the Trigger Transmitter 512, the Polling Transceiver 516, and the Message Refresh Transmitter 503 is sent in serial asynchronous format. A start bit 1701 is transmitted followed by eight data bits 1702 and one stop bit 1703. The least significant bit 1705 is sent first. This format is common in the computer industry. It is implemented in many Universal Asynchronous Receiver Transmitter (UART) integrated circuits. An example is the 8250 Asynchronous Communication Element manufactured by National Semiconductor Corporation.

FIG. 14 shows an example of the group of 4 trigger blocks 1803 that is transmitted every 5 seconds by the Trigger Transmitter 512. When the transmitter circuitry is powered-up at the end of the power-off timer cycle 1601, the hardware begins transmitting carrier with no modulation 1802. This idle time allows the transmitter circuits and the receiver circuits on the shopping cart to stabilize. Next the trigger block 1803 is transmitted 4 times.

Each trigger block 1803 includes a preamble 1804 followed by a flag character 1805, a length character 1806, a block type character 1807, a combined transmitter address and battery status character 1808, and finally a Cyclic Redundancy Check (CRC) 1809 which is two characters long. The preamble 1804 is three character-times of no modulation. This allows the character watchdog timer that is running in the shopping cart electronics to time out and clear the reception buffer in the cart if a partial trigger block 1803 was received. This clearing occurs before each trigger block during the preamble time 1804. If a shopping cart enters the range of a Trigger Transmitter 512 while the transmitter is in the middle of sending a trigger block 1803, the cart will only receive part of the trigger block. When the preamble 1804 of the next trigger block occurs, the partially received trigger block will be cleared from the receiver and all software values will be re-initialized in anticipation of receiving the data in the current trigger block. The flag character 1805 is a unique fixed value that indicates that the next character is the length. The length character 1806 indicates how many characters are remaining in this block after the length character starting with the block type character 1807 through the last CRC character. The trigger block shown has a value of 4. The block type character 1807 indicates what kind of block this is. The Trigger Transmitter sends a block type value of zero to indicate that this is a trigger block. The next character 1808 is made up of two data fields. The most significant bit is the battery status as received from the battery state detector circuitry 1507. The low order 7 binary bits are the transmitter address as read from the 7 position DIP switch 1508. The two characters that make up the Cyclic Redundancy Check (CRC) 1809 are computed by the transmitter microprocessor 1505 from the values of the preceding characters in the block. The algorithm is CRC-16 which is commonly used in the computer industry. The CRC 1809 is used to detect errors in the transmission of the blocks 1803. The receiver determines the validity of the data in the block by calculating the CRC from the received data block using the same algorithm as the transmitter. It then compares the calculated CRC to the received CRC 1809. If they match the data block 1803 has a very high probability of being correct. If they do not match, the block is ignored by the receiver.

A short duration of unmodulated carrier 1810 is sent after the fourth trigger block. During this time the microprocessor on the shopping cart is calculating the CRC on the fourth block to verify the data in the block. There is a possibility that spurious characters may be received by the cart when the transmitter power is shut off. This idle time delays the possible reception of these noise characters and the microprocessor interrupts that they produce.

FIG. 15 is a flow chart of the software that the trigger transmitter single chip microprocessor 1505 executes on power-up after the reset cycle is complete. It first performs its initialization routine 1901 to set the processor operation modes, interrupts, registers, etc. The only variable part of the transmission block is the address and battery status byte 1808. At 1902 the microprocessor 1505 reads the 7 bits of transmitter address from the DIP switch 1508 and reads the battery status from the battery state detector 1507. This data is combined into one byte, the top bit being the battery status and the low order 7 bits the transmitter address. Next at 1903 the CRC is calculated for the complete trigger transmission block 1803. The software next delays at 1904 to allow the external transmitter and receiver circuits to stabilize.

The next area of the flow chart is a loop that is executed 4 times. First the loop counter is incremented 1905. Next at 1906 a three character-time delay is executed. This transmits a preamble 1804 that has no modulation on it. Then at 1907 the rest of the trigger block 1803 is transmitted. The rest of the block consists of a flag character 1805, a length character 1806, a block type character 1807, a character 1808 that is the transmitter address (7 bits) combined with the battery status as the most significant bit, and finally two characters of Cyclic Redundancy Check (CRC) 1809. The transmission is done in software by toggling a bit on an output port. This is a "software UART" except that the start, data, and stop bits are differentially encoded as they are sent by the microprocessor 1505. This encoding, along with the Phase Shift Keyed (PSK) modulator circuit, produces Radio Frequency (RF) transmissions that are Differentially Phase Shift Keyed (DPSK).

The loop counter is tested at 1908. When the 4 loops are complete, the software delays again to transmit unmodulated carrier 1810 at 1909. Then a bit 1517 on an output port is toggled at 1910. This triggers the power-down timer circuit 1502 which removes battery power from all of the transmitter circuitry except the power-down timer itself. As the battery power to the CPU is falling, the CPU attempts to put itself into power-down mode at 1912. This is to save additional battery power.

In FIG. 16 the Trigger Transmitter antenna coil 2001, which is preferably mounted on a shelf edge at the floor, and the shopping-cart-mounted receive antenna 2002 are shown schematically. Each is a solenoid of wire with its main axis oriented vertically. The primary coupling between the two coils is magnetic (H-field). Each coil is resonant at 400 KHz.

Figure 7:
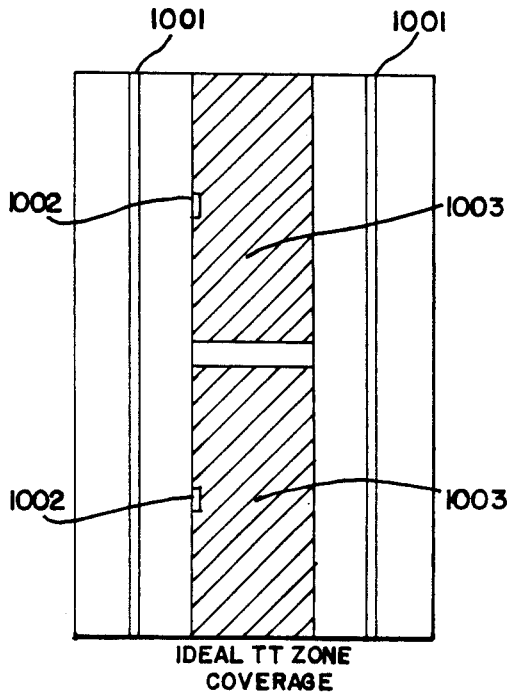
FIG. 7 is an ideal trigger-transmitter zone coverage.

FIG. 7 depicts an ideal Trigger Transmitter aisle zone coverage. The figure is a top view of an aisle with shelves 1001 on both sides. Two example trigger transmitters 1002 are mounted on the left side of the aisle. The resultant "ideal" zone coverage 1003 of the aisle is shown. The zones are perfectly rectangular, of uniform field density, and abut each other perfectly with no overlap.

Figure 8:
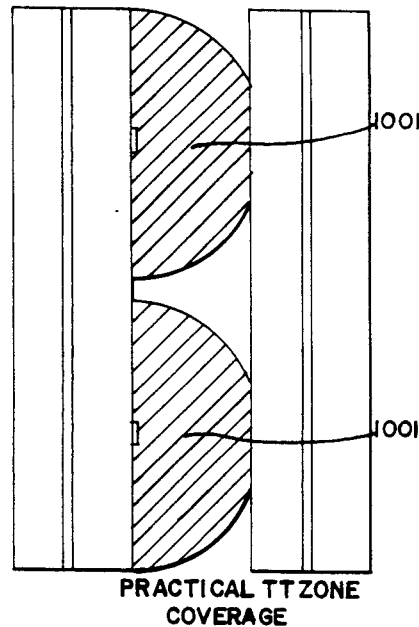
FIG. 8 is a practical trigger-transmitter zone coverage.
Figure 9:
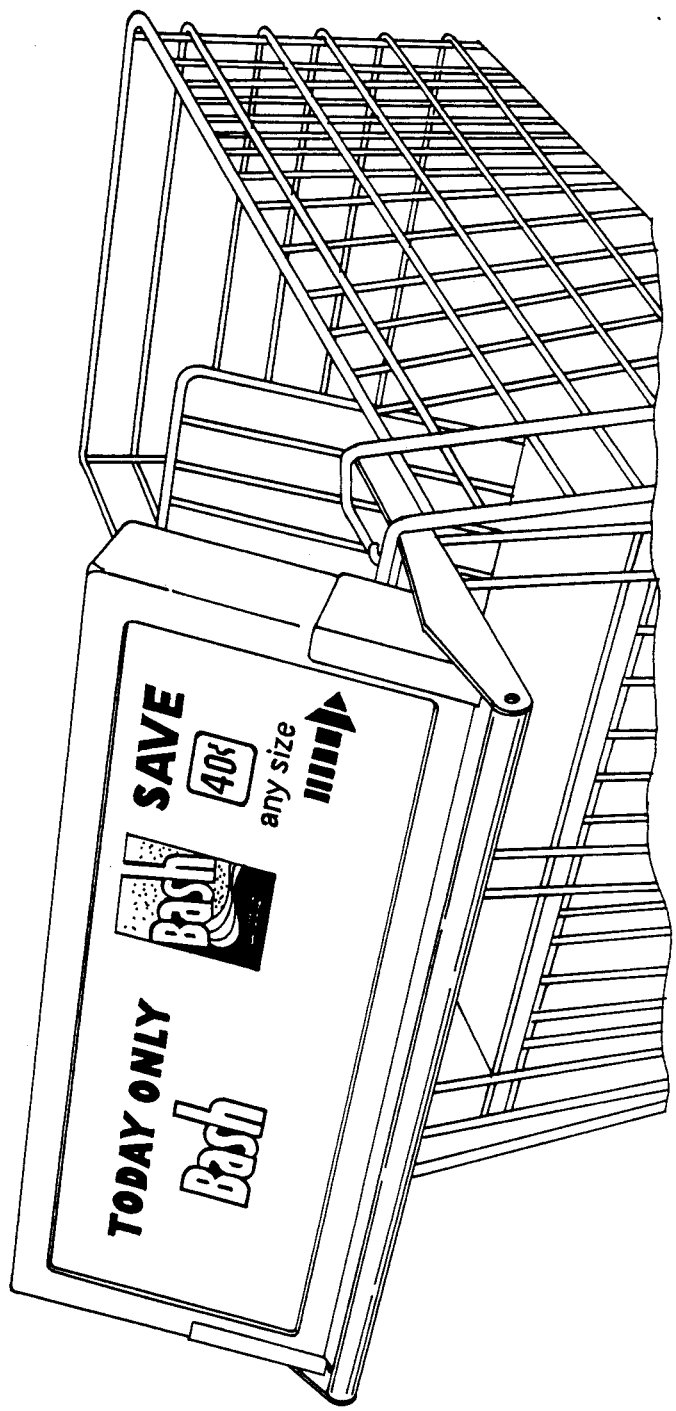
FIG. 9 shows the physical configuration of the display and cart.
Figure 10:
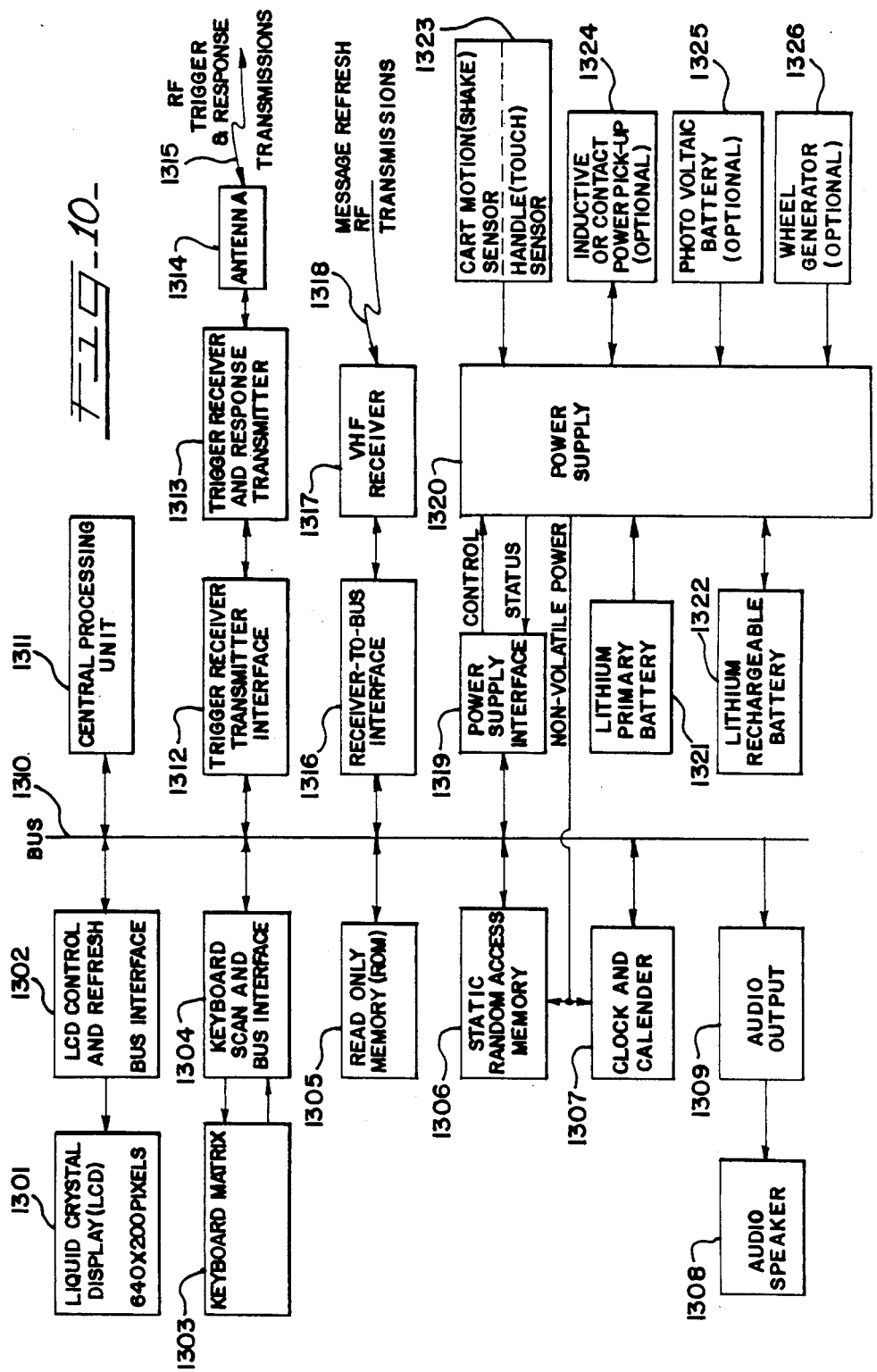
FIG. 10 is a block diagram of the cart-based electronics.

FIG. 8 is similar to FIG. 10, but depicts a practical Trigger Transmitter aisle zone coverage. The zones are not rectangular, not of uniform field density, and do not abut each other perfectly. Within the zone, the trigger transmissions are strong enough to trigger the display of a message if there is a corresponding message stored in the cart.

As shown in FIG. 17, the Response Transmitter 2107, 2112, 2111, 2110, 2109, 2108, 2102, 2101 in the shopping cart electronics is very similar to the Trigger Transmitter 512 that is located on the shelf edge. In the presently preferred embodiment UART 2107 a Model No. SCC 2691 manufactured by Signetics Inc. Serial asynchronous data 2113 from the UART 2107 and 9600 baud data clock 2114 are applied to DPSK encoder 2110. The encoder 2110 provides a zero degree or 180 degree phase shift from carrier input to output based on data 2113 and data clock 2114. The 400 KHz oscillator 2111 provides unmodulated carrier to the modulator 2110. The CMOS logic inverter 2109 and the two power drivers 2108 (each a power MOS FET) provide current gain and complementary drive to the loop antenna 2101 when they are connected to the antenna by the antenna switch 2102. Control of the antenna switch 2102 is by the transmit enable input to 2102. When high, the antenna 2101 is attached to the power drivers 2108. The antenna 2101 is resonant at 400 KHz. The transmissions radiated by the antenna 2101 are 400 KHz DPSK, asynchronous, half-duplex, at 9600 baud. The Response Transmitter allows the shopping cart electronics to respond to interrogations from the Polling Transceiver 516 during the time the cart is at the check out station 515.

The Trigger Receiver 2101, 2102, 2103, 2104, 2105, 2106, 2107 mounted on the shopping cart picks up trigger transmissions 513 from the Trigger Transmitters 512 mounted on the shelves. It also picks up transmissions from the Polling Transceiver 516 mounted at the check-out lane 515 when the cart is in the check-out lane. When the transmit enable input to the antenna switch 2102 is low, RF energy picked up by the antenna is coupled to the amplifier and bandpass filter 2103. The output of the amplifier 2103 is simultaneously coupled to the DPSK decoder 2104 and carrier threshold detector 2105. The carrier threshold detector 2105 generates an AGC signal which is fed back to control the gain of amplifier 2103. This is well known in the art. When the received signal is of adequate level, the threshold detector 2105 outputs a signal that is coupled to 2104 and the logic gate 2106. The DPSK decoder 2104 contains a Phase Locked Loop (PLL). Only when the PLL is in lock and the signal from 2105 is present does the decoder 2104 enable the received data (RXD) 2115 to the UART 2107. Gate 2106 asserts the Data Carrier Detect (DCD) signal 2116 to the UART 2107 only when the carrier level as measured by 2105 is adequate and the PLL in 2104 is in a locked condition. The UART 2107 contains an on-chip Baud Rate Generator to control data transmit 2113, 2114 and receive 2115 rates. Clock is controlled by the crystal 2112. The UART 2107 provides data, status and interrupts to the microprocessor bus 1310 and microprocessor 1311.

Power utilization of the Trigger Receiver and Response Transmitter is minimized by powering up only necessary sections of the circuit (i.e. the receiver section 2117 or the transmitter section 2118) and by controlling the power down mode of UART 2107. This is to maximize battery life in the shopping cart electronics.

Figure 18:
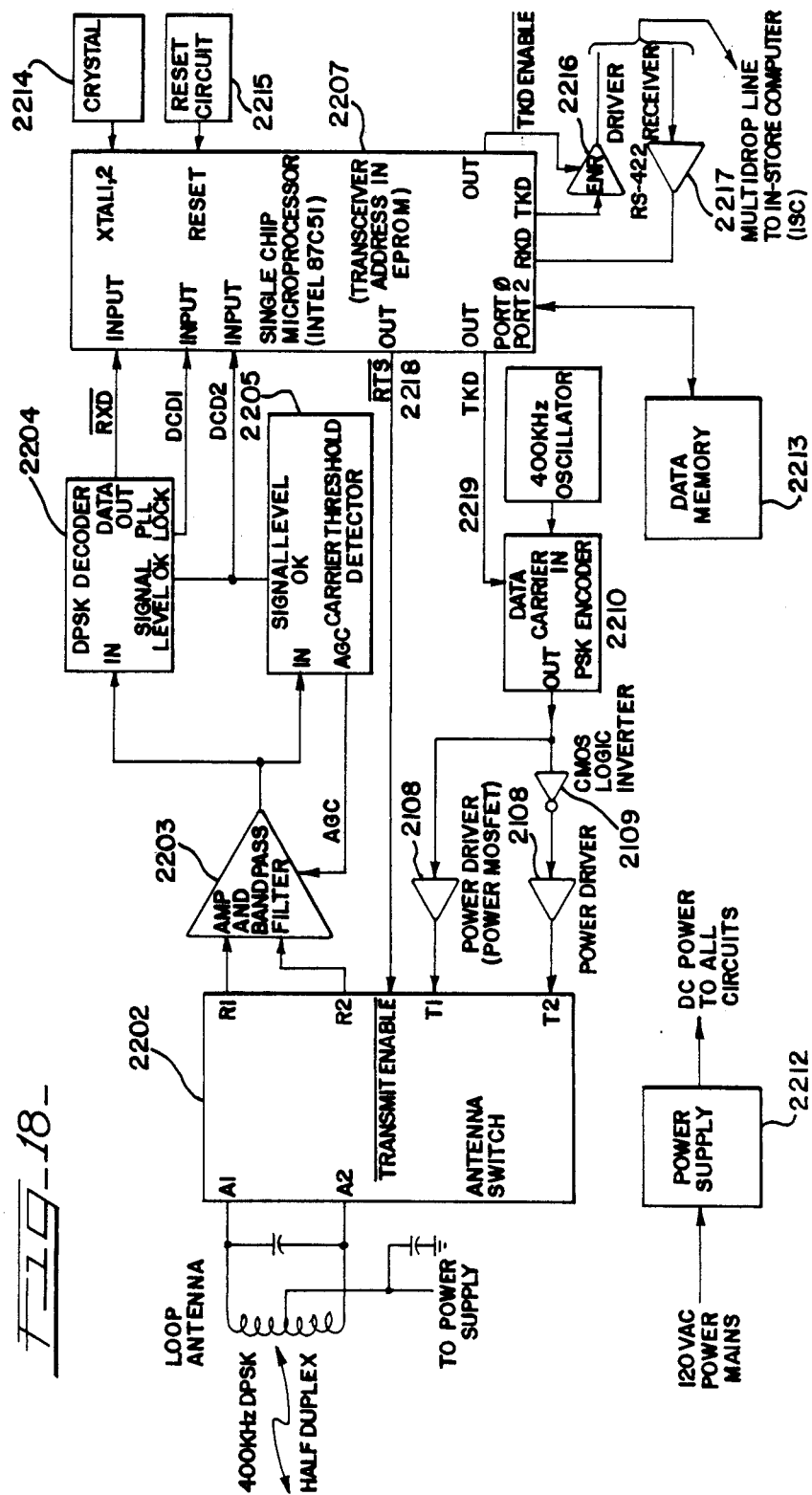
FIG. 18 is a block diagram of the polling transceiver.

FIG. 18 shows the Polling Transceiver (PT) 516, which is mounted at the checkout lane. It forwards queries from the In-Store Computer (ISC) 502 to the electronics mounted on the shopping cart. The cart sends responses which the Polling Transceiver 516 returns to the ISC 502. The Local Area Network (LAN) 517 connection between the ISC 502 and PT 516 is by an RS-422 multidrop asynchronous hardwired link at a rate of 9600 baud. Each PT 516 has a unique address on the LAN which corresponds with the check-out lane number. The link between the PT 516 and the shopping cart based electronics 514 is 400 KHz Differentially Phase Shift Keyed (DPSK) Radio Frequency (RF), asynchronous, half duplex, at a rate of 9600 baud. All links use a byte count protocol.

The description of the Polling Transceiver 516 is very similar to the previously described Trigger Receiver and Response Transmitter except for the following exceptions. Block 2207 is now a single chip microprocessor (Intel Corporation 87C51) instead of a UART 2107. Block 2204 now provides signal DCD1. Block 2205 now provides signal DCD2. The microprocessor 2207 does a logical AND of these two signals to produce a Data Carrier Detect (DCD) signal in software. The microprocessor 2207 directly controls the state of the antenna switch 2202 by signal "Request To Send not" (RTS not) 2218. The serial data 2219 sent from the microprocessor 2207 to the encoder 2210 is differentially encoded by the "software UART" (previously described in the Trigger Transmitter 512) therefore 2210 is now a PSK encoder and does not require a data clock as in the Response Transmitter.

The Polling Transceiver 516 has additional circuitry. The power supply 2212 converts 120 volt alternating current to direct current to supply all of the circuits. The data memory 2213 provides a buffer for messages received from the ISC 502 via the LAN 517 which are to be forwarded to the shopping cart electronics 514 and vice versa. The crystal 2214 controls the clock signal to the microprocessor 2207 in a reset state during power-up until the power supply voltages and microprocessor clock are stable.

The ISC 502 originates a Local Area Network (LAN) which is connected to all of the PT 516 units in the store. The interface to the LAN is via driver 2216, receiver 2217 and the serial interface of the microprocessor 2207. The link is RS-422 multidrop. The LAN address of each specific PT is put into the EPROM of the single chip microprocessor 2207 at time of manufacture.

FIG. 19 shows the format of a transmission block sent by the Polling Transceiver 516. The Polling Transceiver (PT) 516 can send four types of commands to the shopping cart electronics 514. They are poll, log dump, log clear, and power down. The value of the type character 2304 determines what the command is. The format of the commands is similar to the trigger blocks transmitted by the Trigger Transmitter 512. The protocol is a byte count type. Each character of the transmission block is sent asynchronously, one start bit 1701, eight data bits (least significant bit first) 1702, and one stop bit 1703. A command includes a preamble (30 bit-times of idle state) 2301, a flag character 2302, a length character 2303, a block type character 2304, a Polling Transceiver address 2305, two characters of Cyclic Redundancy Check (CRC) 2306, and a postamble (30 bit-times of idle state) 2307. The flag 2302 is a fixed eight bit value. The length character 2303 indicates how many characters are in the block starting with the block type character 2304 through the last CRC character 2306.

The block type character 2304 has four values. A value of one indicates that this is a poll request (command) to the shopping cart. The cart will respond with a status response as described in FIG. 20. A value of two indicates that this is a log dump request (command) to the shopping cart. The cart will respond with a log dump response shown in FIG. 21. A value of three indicates that this is a log clear request (command) to the shopping cart. A value of four indicates a power down request (command) to the shopping cart. The cart will then power down. The cart will respond with a log clear response as shown in FIG. 22. The response blocks (FIGS. 24, 25, and 26) use a byte count protocol that is similar to that of the Trigger Transmitter 512 except that the byte count field 2403, 2503, 2603 are two characters (sixteen bits) long.

FIG. 19 shows the presently preferred embodiment of the display mounted on the shopping cart. The back of the display electronics rests on the original cart handle. A new handle 1201 is attached in front of the display. The display is a super-twist or hyper-twist liquid crystal display (LCD) for low power consumption and high contrast. Its resolution is 640 picture-elements (pixels) across by 200 pixels high. The display is overlaid with a transparent touch-sensitive keyboard. This provides for a very flexible keyboard configuration because the key legends can be changed under program control.

FIG. 10 is a block diagram of the SCD cart-based electronics 514. The man-machine interface is provided by the display 1301, keyboard 1303 and audio speaker 1308 sections. The liquid crystal display (LCD) 1301 is preferably a super-twist type for high contrast and wide viewing angle. The display is a multiplexed type that requires a refresh controller 1302. The keyboard is a clear overlay on the LCD. The keyboard scanner 1304 provides an interrupt per character to the central processing unit (CPU) 1311. This allows the CPU to go into low power mode whenever it is idle in order to conserve battery life. The keyboard interrupt will bring the CPU out of low power mode when required. The keyboard interface 1304 can produce CPU reset to the CPU 1311 for a keystroke, when conditioned by software. The audio output subsystem 1308 and 1309 provides output of various pitches and crude speech.

The Read Only Memory (ROM) subsystem 1305 provides storage and retrieval of fixed program and data segments for the CPU 1311. Data is loaded into the ROM at time of system manufacture. An example of fixed data is the unique serial number which is loaded into each cart during manufacture.

The static Random Access Memory (RAM) 1306 with non-volatile power provides dynamically changeable storage and retrieval of program and data segments for the CPU. Program and data segments can be down loaded via the refresh receiver 1316 and 1317 from the In-Store Computer. This allows rapid update of software in the carts. The non-volatile clock and calendar provides date, time of day, and clock interrupts to the CPU. The clock circuitry 1307 can produce CPU reset to the CPU 1311 when an "alarm" date and time is reached.

The Central Processing Unit (CPU) 1311 provides overall system control and program execution. It is a low power Complementary Metal Oxide Semiconductor (CMOS) microprocessor.

The Trigger Receiver subassembly 1312 consists of a loop antenna 1314, receiver circuitry 1313, and a CPU bus interface 1312. The antenna 1314 is optimized for reception of low-frequency magnetic (H-field) transmissions 1315 from trigger transmitters 512 and polling transceiver 516. The trigger receiver has a fast acting Automatic Gain Control (AGC) circuit with signal amplitude discrimination. Only signal amplitudes above a set reference enable the output of the receiver circuitry and cause an interrupt to the CPU 1311. The reference is based on the AGC voltage and, therefore, varies as the AGC voltage varies.

The Trigger Receiver could alternately be implemented as a microwave, infra-red, or ultrasonic receiver in correspondence with the Trigger Transmitter.

A return transmit path is also provided by transceiver 1312, 1313, and antenna 314. This allows low duty cycle return transmission from the cart to the In-Store Computer and store scanning system at check out.

The Message Refresh Receiver subassembly also contains a VHF receiver 1317 along with a receiver to bus interface 1316. Only signal amplitudes above a set reference level enable the output of the receiver circuitry and cause an interrupt to the CPU 1311.

The power supply 1320 provides power, power control, battery recharge control, and power supply status to the cart-based electronics to minimize power dissipation and maximize battery life. The lithium primary battery 1321 provides non-volatile power to the Static RAM 1306 and the clock and calendar 1307. The lithium rechargeable battery 1322 is the main power source for all of the SCD cart-based electronics 514. The current status (discharged or charged) of these batteries can be reported to the CPU via the power supply interface 1319. This status is returned by the response transmitter to the ISC during check-out. Store personnel can be alerted to replace discharged battery packs.

The power supply can also turn power on and off to various subsystems on the cart, under control of the CPU. Power can be independently controlled to the display 1301 and 1302, the audio subsystem 1308 and 1309, the trigger receiver and response transmitter 1312, 1313, and 1314, and the message refresh receiver 1316 and 1317.

The power supply also monitors and reports the status of a cart motion (shake) sensor and handle touch sensor 1323 and provides an interrupt to the CPU upon detection of motion. The motion sensor might be combined in the wheel generator 1326 if a generator is used on the cart system. If the cart has not moved in a relatively long time, the CPU turns off power to all of the subsystems that it can and puts itself into power down mode.

The handle touch sensor is used to determine if a consumer was at the cart when a particular ad was displayed. This data on ad delivery is returned during check-out to the ISC and to the studio. This data is similar to the electronic diaries ("People Meters") used in the television ratings business.

DESCRIPTION OF SHOPPING-CART-BASED SOFTWARE

The Shopping Cart Display (SCD) software consists of foreground and background tasks. The foreground tasks consists of initialization, idle loop, and display execution. There are two background (interrupt driven) tasks executing. The first task is Message Refresh. It is detailed in FIGS. 30 through 39. The second task operating is the Trigger reception task. Trigger reception is detailed in FIGS. 40 through 43.

FOREGROUND TASK (MAIN LOOP)

In FIG. 23, at 2701 the microprocessor 1311 has completed a hardware reset. Reset occurs for several reasons. First, power up after an unexpected power down (i.e. complete battery failure). The other sources of a microprocessor hardware reset occur as a result of some peripheral device action. The software at 2703 tests the warm boot flag. If the flag is not set, then this reset occurred unexpectedly (as a part of power up upon installation of new batteries.) Consequently, the diagnostic programs are executed at 2705 with the results displayed on the liquid crystal display. Next, the cold boot initialization routine is executed at 2707 to initialize system variables and memory.

If the warm boot flag was set, it indicates that this reset was anticipated by the software. These types of resets can occur from the motion sensor, handle sensor, clock or keyboard after their interface circuitry has been conditioned by software to output the hardware reset signal instead of interrupt signal. If after CPU reset, a keyboard request is pending, then at 2709 and 2711 the character is taken from the interface circuit and loaded into the keyboard buffer. Next the warm boot flag is cleared at 2713 and the warm boot initialization routine is executed at 2715. Next, at 2717, the external interfaces which could cause CPU resets, are initialized so as to generate interrupts not CPU reset. Next the software powers up the Trigger and Message Refresh receivers at 2719 and loads and starts the activity watchdog timer at 2721. This watchdog timer is reinitialized and loaded by any activity (keystrokes, cart motion, handle touch). When the watchdog timer times out, for example after 15 minutes of inactivity, the cart will power down to conserve battery life.

Next at 2733 is the start of the idle loop. At 2735 the microprocessor 1311 is put into a low-power halt mode. In this mode, the CPU clock is still running, but CPU execution is halted at the instruction that put the CPU into the low-power halt mode, and interrupts are still active. In this mode CPU power consumption is significantly reduced. After an interrupt occurs and the return from the interrupt service routine is executed, the CPU begins execution at the instruction following the instruction that caused the CPU to enter the low-power halt mode. The Hitachi 64180 and the Intel 80C31 examples of CMOS microprocessors with this low-power halt mode.

At 2735 the CPU waits in this low-power mode for the next interrupt to occur. At the termination of the interrupt service routine, the next instruction after 2735 is executed. First the display state machine activity is tested at 2737 (i.e. is a message being actively displayed now). If the state machine is active, control is given to the DISPLAY software routine at 2739. When the DISPLAY routine is done executing, it returns to IDL (to enter low-power mode again). If the display state machine is not active, then at 27441 and 2743 any pending display requests from the Trigger Receiver are executed. This routine is called TSTART. At the termination of TSTART low-power mode is re-entered via IDL. Next at 2745 a test is made for any pending display request from an immediate message delivered to the shopping cart via the Message Refresh radio link. If any requests are pending, the MSTART routine is executed. Upon completion of MSTART, low power mode is re-entered via IDL. At 2749 and 2751 any pending keyboard requests are handled (information requests, game requests, calculator mode). These requests are handled by the KSTART subroutine. At the termination of the KSTART subroutine, the low-power mode is re-entered via IDL. If none of the 4 previous requests are pending, low-power mode is re-entered via IDL to conserve battery power while waiting for the next interrupt.

Referring now to FIGS. 24A–D, at 2801, the DISPLAY subroutine is shown. Its purpose is to execute the display state machine. Each message to be displayed has a control structure and data areas that contain image and audio. The control areas defines a "script" which governs how the image and audio are displayed on the screen. The script structure is similar to that available in a commercial program called SHOW PARTNER by Brightbill-Roberts and Company, Ltd. This is a slide show program with a script associated with it to control transitions between slides. The script structure is quite flexible, in that it can branch between image segments based on keyboard input, time, or other external program inputs (i.e. current trigger address or log of previous trigger receptions). It is a complete application language for controlling display of images and audio. The state machine at 2803 executes this script control structure. At 2805, the DISPLAY subroutine returns to the point where it was called.

The TSTART subroutine at 2807 is executed as a result of a Trigger block being received. The subroutine first gets the message address or number that it is to display at 2809. It then loads and initializes the state machine with the information from the control structure of the requested message at 2811. It next calls the DISPLAY subroutine at 2813 to begin the execution of the script. Finally, at 2815, TSTART returns to the point where it was called.

The MSTART subroutine is executed at 2817 as a result of reception of an Immediate Type 1 or Immediate Type 2 message over the Message Refresh radio link. The header associated with the message is retrieved by the MSTART subroutine at 2819 to determine the message whether it was an immediate 1 or immediate 2 type. Next at 2821 the state machine is loaded with the control information (script) from the requested message. The DISPLAY subroutine is then executed at 2803 to begin execution of the script. Finally, at 2825, MSTART returns to the point where it was called.

The KSTART subroutine 2827 is executed upon request from the consumer via the keyboard for information, games or calculator mode. Much like the previous TSTART and MSTART subroutines, the KSTART subroutine initializes the state machine with the control information from the keyboard message at 2829. Next, at 2831, it begins execution of the state machine by calling the DISPLAY subroutine. Then, at 2833, KSTART returns to the point where it was called.

FIGS. 25 A and B show the interrupt routines associated with the main idle loop. A motion sensor interrupt at 2901 or handle sensor interrupt at 2902 loads and restarts the activity watchdog timer at 2909. Each keyboard interrupt at 2905 also loads and restarts the activity watchdog timer at 2909, but first the keystroke data is saved in the keyboard buffer at 2907. If a long period elapses with no motion or handle touch or keystroke, the activity watchdog timer will count down to zero and generate an interrupt. At this point 2913, the software executes a power-down command by branching to the INACT routine at 2915. This is to conserve battery power. A return-from-interrupt is executed at 2911.

MESSAGE REFRESH TASK

One of the background (interrupt driven) tasks that executes in the Shopping Cart Display (SCD) electronics is the Message Refresh task. The data frames 3001 that it receives are shown in FIG. 26. Each frame consists of a header block 3003 followed by a variable number of subsequent data blocks 3005. The main purpose of the Message Refresh task is to receive, validate and conditionally load the header and data blocks from the Message Refresh Transmitter into memory. The data on this link is a byte-count protocol, consisting of a preamble, a flag character, a length field (2 characters), a block type character, a variable length data field, followed by a 2 character Cyclic Redundancy Check (CRC) field.

FIG. 27 shows the type of data blocks that can be received over the Message Refresh radio link. In FIG. 28, if the block type is hexadecimal 00, this block is a message header. This indicates the subsequent blocks are to have a block type of hexadecimal 08. These are message data blocks. With information present in the message header, the software is able to decide if it already has this message and version stored in local memory. If it already has this message and version number, it ignores the subsequent blocks and waits for the next header or command. In a similar manner, FIG. 28 shows the format of an immediate one, and immediate two message header and a code segment header along with what type of subsequent data blocks are to be expected after each one.

FIG. 29 shows the format of a subsequent message block. It contains a preamble 3301, flag byte 3303, length field 3305 (2 characters), block type character 3307, message number and version number field 3309 (2 characters), Subsequent Message Blocks field 3311 (2 characters), followed by a variable length data field 3313 and a two character CRC field 3315. Block type values 3307 of hexadecimal 08, 09 or 0A indicates that the data field 3313 is part of a message. The data field 3313 is compressed video and audio along with trigger information and a display control structure (state machine variables or script). If the block type value 3307 is hexadecimal OB, the data field 3313 is part of a program that is to be loaded into memory.

In addition to headers and data blocks, the Message Refresh radio link can deliver commands to the SCD electronics. The format of a clock set command is shown in FIG. 30. In conformance with the byte-count protocol, the command contains a preamble 3401, a flag character 3403, a length field 3405 (2 characters), block type character 3407, followed by a data field 3409 that contains clock set parameters and a CRC 3411 (2 characters). In the clock set command the block type value 3407 is hexadecimal 10. When the SCD electronics receives this command, it initializes its time of day clock to the time and date values in the data field.

A second command that can be received over the Message Refresh radio link is the power down command. It has a similar format to that of the previous clock set command. The format of a power down command is shown in FIG. 31. Its block type 3507 is hexadecimal 11. The optional data field 3509 contains a power-up date and time. If the field 3509 is present and contains data within a legal range, the SCD time of day clock alarm is initialized with the values from the data field 3509. The shopping cart then goes into a power down mode to conserve battery power and optionally powers up at the alarm time.

The Message Refresh reception software is detailed in FIGS. 32 through 35. At 3601 upon reception of a message receiver interrupt, this routine is entered. The routine first checks to see that there are no errors detected by the receiver circuitry at 3603. If errors are present, the error exit ME is executed at 3605. If no errors are present, the MR character reception watchdog timer is reloaded with its initial count value and enabled to begin countdown at 3607. This timer is continuously reloaded on reception of each character from the Message Refresh radio link. If a gap in characters longer than the time value of the Message Refresh character reception watchdog timer occurs (approximately 2.5 character times at the link rate of 9600 baud), the timer generates an interrupt at 3630 and executes the ME error exit at 3632. This guarantees that if a partial block is received, the preamble (3 character times) of the next block causes a Message Refresh character watchdog timer interrupt which clears out the partially-received block and reinitializes the software to correctly receive the next block.

After the timer is loaded with its initial value, the received character is read from the receiver circuitry 3609. Depending on the state variable MCRS (Message-Refresh Character Reception State) a series of routines are executed. These routines comprise a state machine for reception of data blocks in the format depicted in FIGS. 26, 27, 28, 29, 30, and 31. If the state is 0 (MCRS=0) at 3611, the message refresh idle, awaiting flag byte (MIDL) routine is executed at 3613. The routine MIDL first checks to see if the received byte equals the flag value at 3637. If not, it discards the character and does a Return From Interrupt (RET I) at 3641. If the received byte is equal to the flag value, then the Message-Refresh Character Reception State (MCRS) is advanced to Active Awaiting Length Byte High at 3639 and a Return From Interrupt (RET I) is executed at 3641.

On receipt of the next Message Refresh character interrupt, the Message-Refresh Active Awaiting Length Byte High (MAALH) routine is chosen at 3615 and is executed at 3617. This routine loads the received byte into the Message-Refresh Byte Count (MBC) high byte at 3645. Next, at 3648, it advances the Message-Refresh Character Reception State (MCRS) to Active Awaiting Length Byte Low. It then executes a Return From Interrupt (RET I) at 3650.

On receipt of the next Message Refresh character interrupt, the Message-Refresh Active, Awaiting Length Byte Low (MAALL) routine is chosen at 3619 and is executed at 3621. This routine loads the received byte into the Message-Refresh Byte Count (MBC) low byte at 3657. It then advances the Message-Refresh Character Reception State (MCRS) to Active Receiving Block at 3659 and executes a Return from Interrupt (RET I) at 3661.

Subsequent Message Refresh character interrupts cause the Message-Refresh Active Receiving Block (MARB) to be chosen at 3623 and executed at 3625. Upon entry, this routine loads the received byte into the next location in the MR Block Reception Buffer at 3701. Next, at 3703, the MR Byte Count (MBC, a 16 bit value) is decremented. If the MBC is not 0 at 3705, more characters are to be received in this block, and therefore, a Return from Interrupt (RET I) is executed at 3707. If the MBC is equal to 0 at 3705, all of the characters for this block have been received. The routine next calculates the CRC on the received block at 3709 and compares this to the CRC that was received in the block at 3711. If they do not match at 3713, the ME Error Exit is executed at 3632. If the two CRC's match at 3713, then it is highly probable that the block has been received correctly. The routine next disables the Message Refresh character reception watchdog timer at 3715 and dispatches on the block type field as received in the data block at 3717, 3719, 3721, 3723, 3725, 3727, 3729, 3731 and 3632.

If the block type is hexadecimal 0, 1, 2 or 3, the Message Header (MH) routine is executed at 3719. If the block type is hexadecimal, 8, 9, A or B, then the Message Block (MB) routine is executed at 3723. If the block type equals hexadecimal 10, then the Set Clock Command (SCC) routine is executed at 3727. If the block type equals hexadecimal 11, then the Power Down command (PDC) routine is executed at 3731. If the block type value does not fall into any of the previous four categories, then the ME Error Exit routine is executed at 3632.

The Message Header (MH) routine 3719 compares the message number and version number from the received header block to those message numbers and version numbers currently in message memory at 3801. If a matching message and version are found at 3803, the software does not need to interpret the subsequent data blocks which will be transmitted on the Message Refresh radio link. The routine will calculate when it expects the next header block to be received based on the baud rate of the Message Refresh radio link and the value of the Subsequent Message Block (SMB) field from the recently received header block, and will then subtract a small value from this and load this value into the Message Refresh (MR) Off Timer, and enable the count down to begin at 3805. It will then disable MR receiver interrupts at 3807 and power down the MR receiver circuits at 3809 to conserve battery power. It then executes a Return from Interrupt (RET I) at 3811.

At the end of the Message Refresh (MR) Off Timer period, an interrupt is generated. The interrupt routine 3825 powers up the MR receiver circuits at 3827 and executes an Error Exit ME routine at 3632 to reinitialize all variables. This will allow the state machine to begin reception of the next data block in anticipation of receiving the next header block.

If the message number and version number from the received header block is not found in message memory at 3803, the Message Refresh State (MRS) is set to active (MRS=1) at 3813. Next, the Subsequent Message Block (SMB) field, is read into the SMB variable in memory at 3815. The Message Refresh block reception watchdog timer is loaded with its initial value and enabled to begin countdown at 3817. If a subsequent message block is not received within the watchdog timer period, an interrupt is generated. The interrupt routine 3823 executes an Error Exit ME routine at 3632 to reinitialize the state machine variables. At 3819 the received header data is saved in memory in a header save area. Next, at 3821, the MX message exit routine is executed.

Once a message header has been received, the next blocks will be message blocks. This will cause execution of the message block (MB) routine 3723. The routine checks the Message Refresh State (MRS) to see that it is active at 3830. If a message block is received without a previous header being received, this is an error, and the ME error exit routine is executed at 3632. If a message block is received after a header, the message number and version number of this block is compared with the saved header message and version values at 3832. If the values do not match at 3834, this block is to be discarded and the ME Error Exit routine is executed at 3632. If they do match, the variable SMB (Subsequent Message Block) is decremented at 3836. This is compared with the received SMB field from the current message block at 3838. If they do not match, this block is out of sequence and the ME Error Exit is executed at 3632. If the received SMB matches the in memory SMB, then this data block is correct. The routine next sets the Update In Progress flag on this particular message in memory at 3840. Using the control information from this received message block, the data area of the received block is moved to the message memory area at 3842.

If the in-memory SMB variable is not equal to zero at 3844, then more message blocks are expected for the update on this message and the MX exit routine is executed at 3821 in anticipation of receiving the next blocks. If the SMB variable is equal to zero at 3844, then this is the last message block for this message. The routine clears the Update In Progress flag on this message in memory at 3846. It next examines the the saved header area in memory at 3848. If the saved header type is not an immediate 1 or immediate 2 type, then this message refresh is complete and the ME exit routine is executed at 3632 to clean up variables. If the saved header type is an immediate 1 or immediate 2, then the saved header area is copied into the queue for the foreground display task to retrieve at 3850. Next, at 3632, the ME exit routine is executed to cleanup variables.

At 3727, the Set Clock Command (SCC) is shown. This routine retrieves the data field from the received block and loads this into the SCD time-of-day clock. It then executes an MX exit routine 3821 to clean up variables.

The Power Down Command (PDC) routine 3731 first disables all interrupts at 3903 and checks the data field of the received command to see if the time and date are within valid ranges at 3905. If they are, the routine conditions the clock interface circuitry to produce a CPU reset signal upon detection of an alarm condition at 3907. Next, at 3909, the alarm section of the time-of-day clock is loaded with the data from the received block. If the data field of the power down command does not contain valid time values, the routine does not set or condition the alarm section of the time-of-day clock. Next, the warm boot flag is set at 3911. This flag indicates to the reset software 2701 that this CPU reset is expected. The INACT routine 2915, after disabling all interrupts at 3910, enters the routine just before the setting of the warm boot flag at 3911. Next, at 3913, the motion sensor interface, handle sensor interface and keyboard interface are conditioned to produce the CPU reset signal not the interrupt signal. The routine next powers down the receivers, the response transmitter and display at 3915 to conserve battery power. Next, at 3917, the program counter return stack is cleaned up by popping-off and discarding the interrupt return address. Finally, this routine sets the microprocessor into its power-down halt mode at 3919. In this mode, the only way that the microprocessor will restart is via a hardware reset signal. Since the CPU clock is not running at this time, interrupts are ignored. The microprocessor will stay in this mode until a reset signal is generated by one or more of four events occurring: (1) motion sensed by the motion sensor interface, (2) a handle touch sensed by the handle sensor, (3) a key-press on the keyboard, 4) an alarm condition produced by the time-of-day clock.

The ME exit routine 3632 sets MRS=0 at 3921, SMB=0 at 3923, disables the MR block reception watchdog timer at 3925, and clears the header save area in memory at 3927. The MX message exit routine 3821 clears the Message Refresh (MR) block reception buffer at 3929. It sets the MR Character Reception State to idle at 3931. It disables the MR character reception watchdog timer at 3933. It then reinitializes the MR receiver circuitry at 3935 and enables the MR receiver interrupts at 3937. Finally, at 3939, a Return from Interrupt (RET I) is executed.

TRIGGER RECEPTION TASK

Another background (interrupt driven) task that is executed in the Shopping Cart Display (SCD) electronics is the Trigger Reception task. The main purpose of this software is to receive, validate and act upon receptions from the Trigger Transmitters 512, and Polling Transceivers 516. These transmissions are in a byte-count protocol and are detailed in FIGS. 18 and 23. Optionally, depending on the transmission received, the SCD electronics can return a response to the Polling Transceiver 516 in a format detailed in FIGS. 24, 25 and 26.

The Trigger reception software is detailed in FIGS. 36 through 39. At 4001 upon reception of a Trigger receiver interrupt, this routine is entered. The routine first checks to see that there are no errors detected by the Trigger receiver circuitry at 4003. If errors are present, the TE error exit routine is executed at 4005. If no errors are present, the Trigger character reception watchdog timer is reloaded with its initial count value and enabled to begin countdown at 4007. This timer is continuously reloaded on reception of each character from the Trigger Receiver. If a gap in characters longer than the time value of the Trigger character reception watchdog timer occurs (approximately 2.5 character times at the link rate of 9600 baud), the timer generates an interrupt 4130 and executes the TE error exit routine 4005. This guarantees that if a partial Trigger block is received, the preamble (3 character times) of the next block will cause a Trigger character watchdog timer interrupt which clears out the partially-received block and reinitializes the software to correctly receive the next Trigger block.

After the timer is loaded with its initial value, the received character is read from the Trigger receiver circuitry at 4009. Depending on the state variable TCRS (Trigger Character Reception State) a series of routines are executed. These routines comprise a state machine for reception of data blocks in the format depicted in FIGS. 18 and 23. If the state is 0 (TCRS=0) at 4011, the Trigger Idle, awaiting flag byte (TIDL) routine is executed at 4013. The routine TIDL first checks to see if the received byte equals the flag value at 4037. If not, it discards the character and does a Return from Interrupt (RET I) at 4041. If the received byte is equal to the flag value, then the Trigger Character Reception State (TCRS) is advanced to Trigger Active Awaiting Length at 4039 and a Return From Interrupt (RET I) is executed at 4041.

On receipt of the next Trigger character interrupt at 4015, the Trigger Active Awaiting Length (TAAL) routine is executed at 4017. The routine TAAL first checks the value of the received byte at 4029. If the received byte value is 3 or less, it is not a valid length byte and the TE error exit routine is executed at 4005. If the received byte value is 4 or more, the value is loaded into the Trigger Byte Count (TBC) at 4031. It next advances the Trigger Character Reception State (TCRS) to Trigger Active Receiving Block at 4033. It then executes a Return from Interrupt (RET I) at 4035.

Subsequent Trigger character interrupts at 4019 cause the execution of the Trigger Active Receiving Block (TARB) routine at 4021. Upon entry, this routine loads the received byte into the next location in the Trigger Block Reception Buffer at 4043. Next, at 4045, the Trigger Byte Count (TBC) is decremented. If the TBC is not 0 at 4047, more characters are to be received in this Trigger block, and therefore, a Return from Interrupt (RET I) is executed at 4049. If the TBC is equal to 0 at 4047, all of the characters for this Trigger block have been received. The routine next calculates the CRC on the received block at 4051 and compares this to the CRC that was received in the block at 4053. If they do not match at 4055, the TE error exit routine is executed at 4005. If the two CRC's match at 4055, then it is highly probable that the Trigger block has been received correctly. The routine next disables the Trigger character reception watchdog timer at 4057 and dispatches on the block type field as received in the Trigger block. Based on the block type character, one of six routines is executed.

If the received block type field equals 0 at 4059, the received block is a Trigger block. The Trigger block routine begins at 4061. The SCD electronics keeps track of all trigger blocks received by keeping a log in memory. This allows the SCD to track its route within the retail store. It also allows interpolation between different trigger addresses to allow display of message that have a direction sense (i.e., left or right). A display state machine uses the trigger log to modify the display of images. At 4101 the last trigger log entry is examined. If the logged address equals the current trigger address at 4103, then the exit time field of the last log entry is overwritten with the current time from the time-of-day clock at 4105. If the log record indicates that we have displayed a message based on this trigger address at 4107, then the message is not displayed again and the TE exit routine is executed at 4005. If the last log entry does not match the current trigger address at 4103, then a new entry is created in the trigger log at 4109. An example of the trigger log format is shown in FIG. 43. If the display state machine is currently executing (the state machine is not idle, which indicates that we are in the process of displaying a message) at 4111, then the TE exit is executed at 4005. If the display state machine is idle at 4111, then message memory is searched for a message that matches the current trigger address at 4113. If no match is found, the TE exit is executed at 4005. If a matching message is found, an additional test is made at 4117. If the message update flag for this particular message is set, then it is not to be displayed and the TE exit is executed at 4005. If the message is not in the process of being updated, then the message address is saved for the foreground display task at 4119. Next, a display request flag is set for the foreground display task at 4121. Next, the displayed bit is set in the last trigger log entry at 4123. Next, the status of the handle and motion sensors is logged in the current trigger log entry at 4125. Finally, the TE exit is executed at 4005.

The trigger exit, TE routine, is shown at 4005. This is a normal and error exit routine that cleans up the trigger block reception buffer at 4132, the trigger character reception state at 4134, the trigger reception watchdog timer at 4136, and the trigger receiver circuits at 4138. This is in anticipation of receiving the next valid trigger block. The routine finally does a Return from Interrupt (RET I) at 4140.

If the received block type equals 2, it is a poll request (PL) from the check-out transceiver. The PL routine is entered at 4065 and at 4201 builds a status response block in memory as shown in FIG. 24. It then, at 4203, calls the transmit response (TRESP) subroutine and finally does a TE error exit at 4005.

If the received block type equals 2, then a dump log (DL) request has been received. The DL routine is entered at 4069 and at 4205, builds a response block in memory from the data logs that have been accumulated. The format of the response is as shown in FIG. 25. The DL routine next, at 4207, calls the transmit response (TRESP) subroutine and does a TE exit at 4005.

If the received block type equals 3, then a clear log (CL) request has been received. The CL routine is entered at 4073 and at 4209, clears memory resident logs. The routine, at 4211, builds a response block in memory whose format is according to FIG. 26, and at 4213 calls the transmit response (TRESP) routine and does a TE exit at 4005.

If the received trigger block type equals 4, then a Power Down Request (PDR) has been received. The PDR routine 4077 branches to the power down routine (INACT) at 2915.

The transmit response subroutine controls the response transmit circuitry. It is called by commands that are requested to return status and data to the check-out transceiver. Upon entry at 4220, the routine disables the trigger receiver interrupts at 4222. It then waits until the received carrier drops at 4224, which indicates that end of the postamble of the received block. It then powers up the response transmitter circuitry at 4226 and delays until the transmit circuitry is stable at 4228. It then transmits the response block that was built up by the calling routine at 4230. It next powers down the response transmitter circuitry at 4232 and delays until the transmitter circuitry is fully down at 4234. Next, at 4236, it initializes the trigger receiver circuitry and at 4238, enables trigger receiver interrupts. Finally, the transmit response subroutine returns at 4240 to the routine that called it.

A new log entry is created each time the SCD encounters a trigger transmitter whose address is different than the previously logged trigger address. FIG. 43 is an example of the format of the trigger log entry. The log contains the address 4301 of the trigger transmitter whose transmissions created this log. The entry time field 4303 contains the time of day during which this log record was first created. The exit time field 4305 is updated continuously with the time of day while we are in the range of this trigger transmitter. If a message was displayed, the corresponding message number 4307 and version number 4309 is entered into the log. Additional bit flags are present in the log entry. They are: Message Displayed —this flag indicates that a message was displayed; Status of Motion Detector—this flag indicates whether cart was in motion during the message display; Status of Handle Sensor—this flag indicates if the cart handle was being held during the time of message display; Trigger Transmitter Battery Status—this flag is the status of the trigger transmitter battery as received in the trigger transmission block. This status is ultimately reported back to the in-store computer (ISC) 502 via the Polling Transceiver 516 and local area Network (LAN) 517 so that store personnel can replace the batteries in trigger transmitters before they fall.

While the invention has been described with reference to a particular embodiment, those of skill in the art will recognize modifications which nevertheless fall within the scope of the invention.

I claim:

1. A system for communicating product information from a given location to a prospective customer at a remote retail establishment comprising:

means at said given location for transmitting a first signal containing said information to said remote retail establishment;

means at said remote retail establishment for transmitting, in response to said first signal, a second signal containing said information;

means movable by said prospective customer about said remote retail establishment including means for receiving said second signal, means for storing the information contained therein, means operative when triggered by a third signal for retrieving said stored information from said storing means, and means for communicating said retrieved information, in a form discernible by a human, to said prospective customer; and means at said remote retail establishment for automatically transmitting said third signal for automatically triggering said means for retrieving said stored information.

2. The system of claim 1 wherein said means for communicating includes means for displaying said retrieved information.

3. The system of claim 1 wherein said means for automatically transmitting said third signal operates to trigger said means for retrieving automatically, based upon the location of said movable means within said remote retail establishment.

4. The system of claim 1 wherein said means for automatically transmitting said third signal operates to trigger said means for retrieving automatically, based upon the proximity of said movable means to said automatically transmitting means.

5. A system for communicating information relating to a product located in a retail establishment to a prospective customer located in said retail establishment comprising:

means at said retail establishment for transmitting an information signal containing said information;

means movable by said prospective customer about said retail establishment including means for receiving said information signal, means for storing the information contained therein, means operative when triggered by a triggering signal for retrieving said stored information from said storing means, and means for communicating said retrieved information, in a form discernible by a human, to said prospective customer; and means at said retail establishment for automatically transmitting said triggering signal for automatically triggering said means for retrieving said stored information.

6. The system of claim 5 wherein said means for automatically transmitting operates to trigger said means for retrieving automatically, based upon the location of said movable means within said retail establishment.

7. The system of claim 5 wherein said means for automatically transmitting operates to trigger said means for retrieving automatically, based upon the proximity of said movable means to said automatically transmitting means.

8. The system of claim 5 wherein said movable means includes; means for displaying said retrieved information.

9. The system of any one of claims 1-8 wherein said movable means includes means for generating data indicating the presence of a human at said movable means at the time said information is communicated.

10. The system of claim 9 further comprising means for storing said data.

11. The system of claim 10 further comprising means for analyzing said data.

12. A system for communicating information relating to a product located in a retail establishment to a prospective customer located in said retail establishment comprising:

product collecting means movable by said prospective customer about said retail establishment;

triggerable means, mounted on said product collecting means, for storing said information and, when triggered, retrieving said stored information and communicating said information, in a form discernible by a human, to said prospective customer; and means for automatically transmitting a triggering signal independent of said information for automatically triggering said triggerable means to communicate said information based upon the location of said product collecting means within said retail establishment.

13. The system of claim 12 wherein there are a plurality of products located in said retail establishment with respective information relating to each, and said means for automatically transmitting are associated with respective products for selectively triggering said triggerable means to automatically communicate respective said information selectively based upon location of said product collecting means within said retail establishment.

14. The system of claim 12 wherein said means for automatically transmitting operates to trigger said triggerable means automatically, based upon the proximity of said movable product collecting means to said product.

15. The system of claim 3 wherein said means for automatically transmitting is operable for selectively triggering said triggerable means automatically, to communicate said information related to a respective said product selectively based upon the proximity of said product collecting means to the respective product.

16. The system of claim 12 wherein said triggerable means includes means for displaying said retrieved information.

17. The system of claim 13 wherein said triggerable means includes means for storing respective information related to each of said products; means responsive to said triggering signal for selectively retrieving respective said information from said storing means; and means for displaying said retrieved information.

18. A system for communicating product information to a prospective customer in a retail establishment comprising:

product collecting means movable about said retail establishment by said prospective customer;

means, located in said retail establishment, for transmitting a first signal containing said information;

means mounted on said product collecting means including means for receiving said first signal, means for storing the information contained therein, means operable when triggered by a second signal for selectively retrieving at least a portion of said stored information, and means for automatically communicating said selectively retrieved information, in a form discernible by a human, to said prospective customer; and means located in said retail establishment for automatically transmitting a second signal for automatically triggering said means for selectively retrieving based upon the location of said product collecting means within said retail establishment.

19. The system of claim 18 wherein there are a plurality of products located in said retail establishment with respective information relating to each, and a plurality of said transmitting means, each associated with a respective one of said products, and said means for selectively retrieving being responsive to respective said triggering signals for selectively retrieving said information relating to respective said products based upon the location of said product collecting means within said retail establishment.

20. The system of claim 19 wherein respective said information is automatically communicated to said prospective customer based upon the proximity of said product collecting means to a said transmitting means associated with a respective said product.

21. The system of claim 19 wherein said means for communicating selectively automatically communicates respective said information related to a respective said product based upon the proximity of said product collecting means to a transmitting means associated with the respective product.

22. The system of claim 21 wherein said means for storing includes means for storing respective information relating to each of said products.

23. The system of any one of claims 12–21 or 22 further including means for generating data indicating the presence of a human at said product collecting means at the time said information is communicated.

24. The system of claim 23 further comprising means for storing said data.

25. The system of claim 24 further comprising means for analyzing said data.

26. A system for communicating product information from a first location in a retail establishment to a prospective customer located within said establishment comprising:
product collecting means movable about said retail establishment by said prospective customer;
means at said first location for transmitting an information signal, wherein said signal is representative of said information;
means, mounted on said product collecting means, for receiving said signal and storing said information and, when triggered, automatically communicating said information, in a form discernible by a human, to said prospective customer; and
means, located in said retail establishment for automatically transmitting a triggering signal for automatically triggering said movable receiving and communicating means to communicate said information based upon the location of said product collecting means within said retail establishment.

27. A system for communicating a plurality of product advertisements from a central location to prospective customers at a remote retail establishment comprising:
means at said central location for transmitting a first signal representative of said product advertisements to said retail establishment;
means at said retail establishment for receiving said signal, converting the information contained therein into a second signal representative of said product advertisements, and transmitting said second signal;
a plurality of shopping carts located within said retail establishment, each of said carts carrying an electronic display device including a receiver, each of said receivers including means for receiving and storing said second signal representative of said advertisements and triggerable means for selectively displaying one of said advertisements; and
means at said retail establishment associated with a particular product within the establishment for automatically transmitting an electromagnetic trigger signal for automatically triggering said receivers to display the advertisement corresponding to said product only when said receiver is within a predetermined distance from said trigger transmitting means.

28. A system for communicating a plurality of product advertisements from a central location in a retail establishment to a prospective customer within said establishment comprising:
a shopping cart;
an electronic unit mounted on said shopping cart, said unit including memory means for storing electrical signals representative of said product advertisements, a display, triggerable means for selecting which of said advertisements is to be displayed, and means responsive to said selecting means for reading respective stores signals corresponding to said selected advertisement and transmitting said respective signals to said display; and
means located within said retail establishment and associated with a particular product for automatically transmitting a signal for automatically triggering the selecting means of said unit to cause the advertisement corresponding to said selected portion of said stored signal to be displayed on said display only when said unit is within a predetermined distance from said triggering means.

29. A system for communicating a plurality of product advertisements from a central location in a retail store to a prospective customer within said store comprising:
a shopping cart;
an electronic unit mounted on said shopping cart including memory means for storing electrical signals representative of said product advertisements, a radio receiver, a display, means responsive to an output of said receiver for selecting which of said advertisements is to be displayed at a given time, and means responsive to said selecting means for reading respective stored signals corresponding to said selected advertisement and transmitting said respective signals to said display; and
a radio transmitter associated with a particular product within said store, the signal of which causes the selecting means of said unit to cause the advertisement for said particular product to automatically be displayed when said receiver is within a predetermined distance from said transmitter.

30. An electronic display unit for use in an automatic advertising system in which a plurality of external trigger signals are associated with respective products within a retail establishment, and in which the receipt of one of said trigger signals causes said display unit to automatically communicate an advertisement relating to the product associated with said trigger signal, said display unit comprising:

input circuitry for receiving digital data representative of a plurality of product advertisements;

memory means connected thereto for storing said received digital data;

a trigger signal receiver responsive to a said trigger signal representative of a respective one of said plurality of product advertisements for generating an enabling signal;

logic circuitry responsive to said enabling signal for retrieving from said memory means a portion of said data representative of the product associated with said received external trigger signal; and a video display for displaying a video representation of said selected data.

* * * * *